United States Patent [19]

Holmes et al.

[11] Patent Number: 5,653,914
[45] Date of Patent: Aug. 5, 1997

[54] ELECTROLUMINESCENT DEVICE COMPRISING A CHROMOPHORIC POLYMERIC COMPOSITION

[75] Inventors: Andrew Bruce Holmes, Cambridge, Great Britain; Arno Kraft, Duesseldorf, Germany; Paul Leslie Burn, Oxford, Great Britain; Stephen Carl Moratti; Richard Henry Friend, both of Cambridge, Great Britain; Donal Donat Conor Bradley, Sheffield; Neil Clement Greenham, Cambridge, both of Great Britain; Adam Richard Brown, Eindhoven, Netherlands; Josef Herbert Ferdinand Martens, Stuttgart, Germany; Franco Cacialli; Johannes Gruener, both of Cambridge, Great Britain

[73] Assignee: Cambridge Display Technology Limited, United Kingdom

[21] Appl. No.: 481,379

[22] PCT Filed: Dec. 17, 1993

[86] PCT No.: PCT/GB93/02586

§ 371 Date: Oct. 2, 1995

§ 102(e) Date: Oct. 2, 1995

[87] PCT Pub. No.: WO94/15441

PCT Pub. Date: Jul. 7, 1994

[30]   Foreign Application Priority Data

Dec. 18, 1992 [GB] United Kingdom ............... 9226475

[51] Int. Cl.[6] .................................................. H05B 33/14
[52] U.S. Cl. .............................. 252/301.16; 252/301.35; 313/509; 428/690
[58] Field of Search ..................... 252/301.46, 301.35; 313/509; 428/690

[56]   References Cited

U.S. PATENT DOCUMENTS

| 3,401,152 | 9/1968 | Wessling et al. | 260/78.4 |
| 3,404,132 | 10/1968 | Wessling et al. | 260/79.5 |
| 3,532,643 | 10/1970 | Wessling et al. | 262/2 |

(List continued on next page.)

FOREIGN PATENT DOCUMENTS

| 0 319 881 | 6/1989 | European Pat. Off. . |
| 0 373 582 | 6/1990 | European Pat. Off. . |
| 0 387 715 | 9/1990 | European Pat. Off. . |

(List continued on next page.)

OTHER PUBLICATIONS

"Analytical methods for Molecular Weight Determination of Poly(p–Xylylidene Dialkyl Sulfonium Halide): Degree of Polymerization of Poly(p–Phenylene Vinylene) Precursors", Machado, et al., J. Polym. Sci., Polmer Physics, 1989, vol. 27, pp. 199–203 No Month.

(List continued on next page.)

*Primary Examiner*—Melissa Bonner
*Attorney, Agent, or Firm*—Merchant, Gould Smith, Edell, Welter & Schmidt, P.A.

[57]   ABSTRACT

An electroluminescent device is provided incorporating an emissive layer comprising a processible polymer matrix such as poly(methylmethacrylate) and a chromophoric component such as an asymmetric stilbene or distyrylbenzene. The chromophoric component is blended with the polymer matrix or covalently attached thereto as a side chain and is selected to emit radiation in the region 400 nm to 500 nm when excited to luminesce.

8 Claims, 12 Drawing Sheets

U.S. PATENT DOCUMENTS

| | | | |
|---|---|---|---|
| 3,706,677 | 12/1972 | Wessling et al. | 260/2 |
| 4,356,429 | 10/1982 | Tang | 313/504 |
| 5,075,172 | 12/1991 | Dixon et al. | 428/422 |
| 5,231,329 | 7/1993 | Nishikitani et al. | 313/503 |
| 5,247,190 | 9/1993 | Friend et al. | 313/504 |
| 5,389,444 | 2/1995 | Hosokawa et al. | 252/301.16 |

FOREIGN PATENT DOCUMENTS

| | | |
|---|---|---|
| 0 388 768 | 9/1990 | European Pat. Off. |
| 0 390 551 | 10/1990 | European Pat. Off. |
| 0 439 627 | 8/1991 | European Pat. Off. |
| 2-117915 | 5/1990 | Japan |
| 2-209988 | 8/1990 | Japan |
| 3-2209 | 1/1991 | Japan |
| 3-020992 | 1/1991 | Japan |
| 3-37991 | 2/1991 | Japan |
| 3-43991 | 2/1991 | Japan |
| 3-119090 | 5/1991 | Japan |
| 3-137186 | 6/1991 | Japan |
| 3-147290 | 6/1991 | Japan |
| 3-163185 | 7/1991 | Japan |
| 3-250582 | 11/1991 | Japan |
| 4-359989 | 12/1992 | Japan |
| 1177-318 | 9/1985 | U.S.S.R. |
| WO92/03490 | 3/1992 | WIPO |

OTHER PUBLICATIONS

"Blue Electroluminescent Diodes Utilizing Blends of Poly(p–phenylphenylene vinylene) in Poly(9–vinylcarbazole", C. Zhang, et al., Polym. Prepr., 1993, 34, pp. 817–818 No Month.

"Side Change Liquid Crystalline Copolymers for NLO Response", A. Griffin, et al., Nonlinear Optical and Electroactive Polymers, Plenum Publ. Corp., 1988, pp. 375–377 No Month.

"A Light–Emitting Diode Using as Recombination Layer a Blend Containing a Poly–(Para–Phenylene Vinylene) Oligomer", W. Tachelet, et al., University of Antwerp, Department of Chemistry, International Conference on Science and Technology of Synthetic Metals, Gothenburg, Sweden, Aug. 12–18, 1992 No Month.

"A New Series of Electroluminescent Organic Compounds", M. Nohara, et al., The Chemical Society of Japan, Chemistry Letters, 1990, pp. 189–190 No Month.

"Organic Electroluminescent Devices with Bright Blue Emission", Y. Hamada, et al., Optoelectronics—Devices and Technologies, 1992, vol. 7, pp. 83–93, Jun.

"Blue–Light–Emitting Organic Electroluminescent Devices with Oxadiazole Dimer Dyes as an Emitter", Y. Hamada, et al., Jpn. J. Appl. Phys., 1992, vol. 31, pp. 1812–1816, Jun.

"Light–Emitting Diodes Based on Conjugated Polymers: Control of Colour and Efficiency", Paul L. Burn, et al., Mat. Res Soc. Symp. Proc., 1992, vol. 247, pp. 647–654 No Month.

"Molecularly Doped Polymers as a Hole Transport Layer in Organic Electroluminescent Devices", J. Kido, et al., Jpn. J. Appl. Phys., 1992, vol. 31, pp. L960–962, Jul.

"Synthesis of a Segmented Conjugated Polymer Chain Giving a Blue–shifted Electroluminescence and Improved Efficiency", Paul L. Burn, et al., J. Chem. Soc., Chem. Commun., 1992, pp. 32–34 No Month.

"Realization of a Blue–Light–Emitting Device using Poly(p–phenylen)", G. Grem, et al., Advanced Materials 4, 1992, pp. 36–37 No Month.

"Blue Electroluminescent Diodes Utilizing Poly(alkylfluorene)", Y. Ohmori, et al., Jpn. J. Appl. Phys., 1991, vol. 30, pp. L1941–1943, Nov.

"new Thermotropic Polyesters from Distyrylbenzene Bisphenols", T.E. Mates, et al., J. Polymer Science, Polymer Letters, 1990, vol. 28, pp. 331–339 No Month.

"Bright Blue Electroluminescence From Hole Transporting Polycarbonate", C. Hosokawa, et al., Appl. Phys. Lett., 1992, vol. 61 (21), 11/23, 2503–2505.

"Organic Electroluminescent Diodes", C.W. Tang, et al., Appl. Phys. Lett. 51, Sep. 1987, pp. 913–915.

"Electroluminescence of Doped Organic Thin Films", C.W. Tang, et al., J. Appl. Phys. 65, May 1989, pp. 3610–3616.

"Electroluminescence in Organic Films with Three–Layer Structure", C. Adachi, et al., Jpn. J. Appl. Phys. Feb. 1988, 27, pp. L269–271.

"Organic Electroluminescent Device Having a Hole Conductor as an Emitting Layer", C. Adachi, et al., Appl. Phys. Lett., Oct. 1989, 55, pp. 1489–1491.

"Blue Light–Emitting Organic Electroluminescent Devices", C. Adachi, et al., Appl. Phys. Lett., Feb. 1990, 56, pp. 799–801.

Hosokawa et al, "Bright Blue Electroluminescence from Hole Transporting Polycarbonate", Appl. Phys. Lett., vol. 61 (21), Nov. 23, 1992, pp. 2503–2505.

Fig.18.
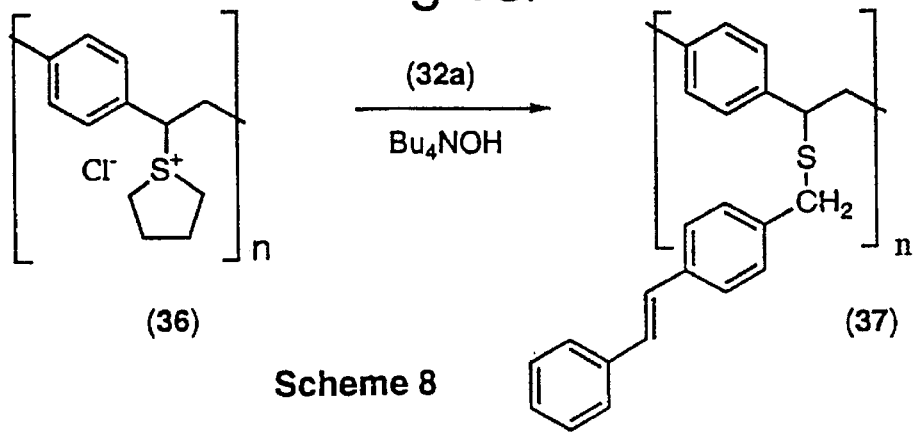
Scheme 8
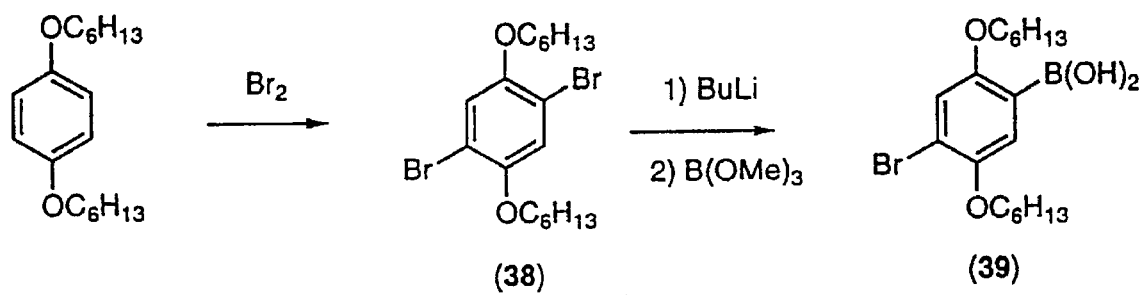
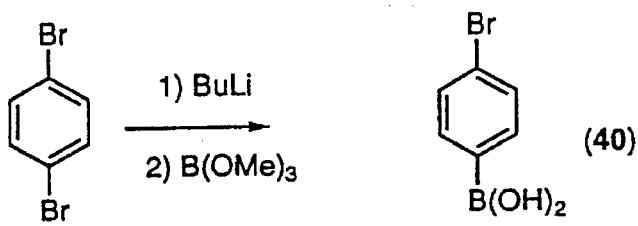
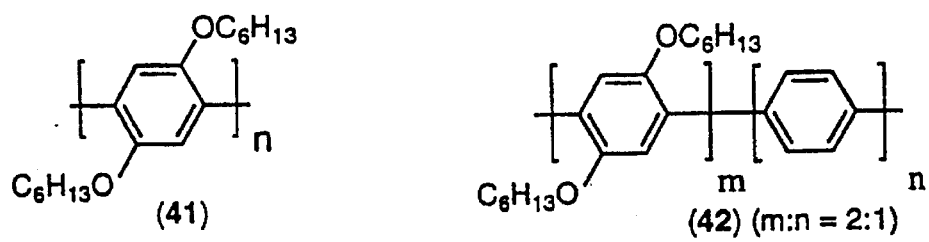
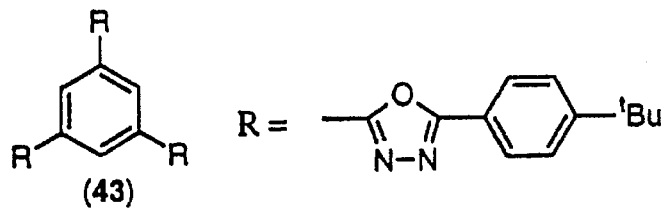
Scheme 9

ELECTROLUMINESCENT DEVICE COMPRISING A CHROMOPHORIC POLYMERIC COMPOSITION

FIELD OF THE INVENTION

This invention relates to semiconductive conjugated polymers for use in blue light-emitting devices, particularly electroluminescent devices.

BACKGROUND TO THE INVENTION

In recent years there have been an increasing number of reports on the use of conjugated molecular materials as the emissive layers in electroluminescent (EL) devices; C. W. Tang and S. A. VanSlyke, Appl. Phys. Lett. 1987, 51, 913; C. W. Tang, S. A. VanSlyke and C. H. Chen, J. Appl. Phys. 1989, 65, 3610; C. Adachi, S. Tokito, T. Tsutsui and S. Saito, Jpn. J. Appl. Phys. 1988, 27, 59; C. Adachi, T. Tsutsui and S. Saito, Appl. Phys. Lett. 1989, 55, 1489; C. Adachi, T. Tsutsui and S. Saito, Appl. Phys. Lent. 1989, 56, 799; M. Nohara, M. Hasegawa, C. Hosokawa, H. Tokailit and T. Kusomoto, Chem. Lett. 1990, 189. These materials have efficient light output and have been shown to be easily amenable to excellent colour variation.

A considerable number of blue light-emitting molecular compounds for electroluminescent devices have been investigated so far. C. Adachi, T. Tsutsui and S. Salvo report a set of examples consisting of anthracene, 9,10-diphenyianthracene, 1,1,4,4-tetraphenylbutadiene, substituted distyrylbenzenes, terphenyl, 1,8-naphthalimides, naphthalene-1,4,5,8,-tetracarboximide, 2,5-bis (5-tert-butylbenzoxazol-2-yl)thiophene, tetraphenylcyclopentadiene, pentaphenyicyciopentadiene and substituted stilbenes in "Blue light-emitting organic electroluminescent devices" published in Appl. Phys. Lett., 1990, 56, 799. Furthermore Eur. Pat. Appl. EP 319 881, EP 373 582, EP 388 768 (Idemitsu Kosan Co. Appl. EP 319 881, EP 373 582, EP 388 768 (Idemitsu Kosan Co. Ltd.) neach that distyrylbenzenes are useful organic compounds for molecular electroluminescent devices. Green, blue-green and blue light emission was observed after varying the substituents on the distyrylbenzene. Other blue light-emitting compounds are quaterphenyl, as mentioned in Eur. Pat. Appl. EP 387 715 (idemitsu Kosan Co. Ltd.), and oligothiophenes, as disclosed in Eur. Pat. Appl. EP 439 627 (Ideminsu Kosan Co. Ltd.). Recently 1,3,4-oxadiazole dimers have been shown to give rise to bright blue emission in molecular electroluminescent devices: Y. Hamada, C. Adachi, T. Tsunsui and S. Saito, Optoelectronics—Devices and Technologies, 1992, 7, 83 and Y. Hamada, C. Adachi, T. Tsutsui and S. Saino, Jpn. J. Appl. Phys., 1992, 31, 1812.

However, amorphous films, as obtained by sublimation and used in all these devices, tend to undergo changes in morphology due to the heat produced under the device operating conditions. This results in the breakdown of molecular electroluminescent devices after longterm storage or even earlier during continuous driving tests.

Working with electron-transporting layers in association with electroluminescent devices which have polymeric light-emitting layers the present applicants found that a uniform dispersion of tert-butyl-PBD (1) in poly(methyl methacrylate) (PMMA) could be formed. The results are reported in "Light-emitting diodes based on conjugated polymers: Control of colour and efficiency", P. L. Burn, A. B. Holmes, A. Kraft, A. R. Brown, D. D. C. Bradley and R. H. Friend in: Electrical, optical, and magnetic properties of organic solid state materials: symposium held Dec. 2–6, 1991, Boston, Mass., USA, L. Y. Chiang, A. F. Garito, D. J. Sandman (Eds.), Pittsburgh, 1992, Mat. Res. Soc. Proc. 1992, 247, 647. Films were obtained by spin-coating a solution of (1) and PMMA in chloroform and were found to be stable under the device operating conditions.

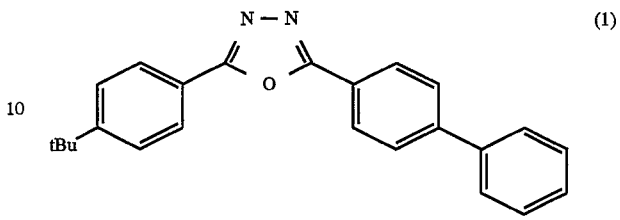

(1)

Dispersion-type electroluminescent devices have been reported in Jpn. Kokai Tokkyo Koho JP 03/147,290 (Hitachi Chemical Co. Led.); Jpn. Kokai Koho-yo Koho JP 03/119, 090 (NEC Corp.); Jpn. Kokai Tokkyo Koho JP 03/250,582 (Hitachi Maxell Ltd.); U.S. Pat. No. 5,075,172 (Cape Cod Research Inc.). "Molecularly doped polymers as a hole transpot: layer in organic electroluminescent devices" teaches the application of a dispersion of N, N'-diphenyt-N,N'-bis(3-methylphenyl)benzidine in polycarbonate as the hole transport layer and tris(8-quinoiinato)aluminum as the emitting layer and is published by J. Kido, K. Hongawa, M. Kohda, K. Nagai, K. Okuyama, Jpn. J. Appl. Phys., 1992, 31, L960. "A light-emitting diode using as recombination layer a blend containing a poly(paraphenylene vinylene) oligomer" has been disclosed by W. Tachetet and H. J. Geise at the International Conference on Science and Technology of Synthetic Metals in Gothenburg, Sweden (Aug. 12–18, 1992). A light-emitting diode has been constructed using 1,4-bis[2-(3,4,5-trimethoxypheny)ethyl)-2,5-dimethoxybenzene blended in polystyrene as the light-emitting layer. According to the authors the advantage of such a blend over a pure oligomer was seen in a combination of mechanical and electro-optical properties which was not easily attainable with the presently known pure electroactive compounds.

Currently the patent literature contains only occasional reports on the use of potential electroluminescent dyes which are attached to a polymer in form of a side chain. Euro Pat. Appl. EP 390 551 (Kabushiki Kaishi Toshiba) discloses a way of introducing light-emitting organic dyes in the repeating unit of main and side chain oligomers with standard linking units.

Recently a number of patents appeared dealing with using polymers as luminescent substances in organic EL devices. Example of such polymers are poly(vinylanthracene), Jpn. Kokai Tokyo Koho JP 03/020 992 and 03/037 991 (Seiko Epson Corp.), and poly(vinylanthracene)/poly(styrene) copolymers, Jpn. Kokai Tokkyo Koho JP 03/002 209 (Idemitsu Kosan Co. Ltd.); it should be noted that during radical polymerisation of vinylanthracene the anthracene ring system does not stay intact and the aromatic ring is not a side chain in the final polymer but is incorporated into the main chain. Ferroelectric liquid crystalline poly (methacrylate)s have been disclosed as dispersants for light-emitting substances, such as perylene, Jpn. Kokai Tokkyo Koho JP 03/043 991 (Canon KK). Polymers of type (—Ar—O—$C_6H_4$—CH(Ar')—$C_6H_4$—O—)$_n$, Jpn. Kokai Tokkyo Koho JP 03/163 185 (Idemitsu Kosan Co. Ltd.), and (co) polymers of vinyl compound monomers having aromatic substituents, Jpn. Kokai Tokkyo Koho JP 03/137 186 (Asahi Chemical Ind. Co. Ltd.), are further examples of prior art.

Conjugated blue light-emitting polymers have also been disclosed. "Synthesis of a segmented conjugated polymer chain giving a blue-shifted electroluminescence and improved efficiency" by P. L. Burn, A. B. Holmes, A. Kraft, D. D.C. Bradley, A. R. Brown and R. H. Friend, J. Chem. Soc., Chem. Commun., 1992, 32 described the preparation of a light-emitting polymer that had conjugated and non-conjugated sequences in the main chain and exhibited blue-green electroluminescence with an emission maximum at 508 nm. Blue light-emission was observed in two other conjugated polymers. Poly(p-phenylene) sandwiched between indium-tin oxide and aluminium contacts has been published by G. Grem, G. Leditzky, B. Ullrich and G. Leising in Adv. Mater., 1992, 4, 36. Similarly, Y. Ohmori, M. Uchida, K. Muro and K. Yoshino reported on "Blue electroluminescent diodes utilizing poly(alkylfluorene)" in Jpn. J. Appl. Phys., 1991, 30, L1941.

Although there are already reports of limited and highly specialised prior art, there is still a need for electroluminescent polymers with a chemically tunable blue light emission.

SUMMARY OF THE INVENTION

The present invention provides an electroluminescent device incorporating an emissive layer comprising a processible polymer matrix and a chromophoric component, wherein the chromophoric component is blended with the polymer matrix or covalently attached thereto as a side chain and is selected to emit radiation in the region 400 nm to 500 nm when excited to luminesce. Compositions are also provided which comprise the processible polymer matrix and the chromophoric component.

A typical electroluminescent device is described in further detail in International Patent Publication No. WO 90/13148 and comprises a semiconductor layer generally in the form of a thin dense polymer film comprising at least one conjugated polymer. A first contact layer is in contact with a first surface of the semiconductor layer and a second contact layer is in contact with a second surface of the semiconductor layer. Typically, the polymer film of the semiconductor layer has a sufficiently low concentration of extrinsic charge carriers that, on applying an electric field between the first and second contact layers across the semiconductor layer so as to render the second contact layer positive relative to the first contact layer, charge carriers are injected into the semiconductor layer and radiation is emitted from the semiconductor layer.

The region 400 nm to 500 nm broadly defines the blue light region for emission. Preferably, the chromophoric component is selected to emit radiation in the region 430 nm to 480 nm, more preferably around 450 nm. As a precondition to electroluminescent emission in the blue light region, the chromophoric component should exhibit fluorescence in the selected wavelength range.

Advantageously, the chromophoric component has the general formula $Ar_1-Ar_2$ or $Ar_1-Ar_2-Ar_3$ in which $Ar_1$, $Ar_2$ and $Ar_3$ are the same or different, each representing an aromatic group. By aromatic group is meant all types of aromatic groups including heteroaromatics, as well as aromatics incorporating more than one ring structure, including fused ring structures. The aromatic groups are conjugatively linked together, for example by a double bond. Advantageously, the double bond has a trans conformation. This is found to be advantageous because cis-stilbene has a much lower fluorescence quantum yield than trans-stilbene, and this is expected to extend to other materials as well.

In a preferred embodiment, the chromophoric compound is asymmetric in order to improve the solubility of the chromophoric compound in both the polymer matrix and in the medium used for processing. Asymmetry may be introduced into the chromophoric compound either by the nature of the aromatic groups or by the incorporation of one or more substituents on the ring of at least one of the aromatic groups. For example, a heteroaromatic group may be chosen as one of the aromatic groups in which the heteroatom is such that asymmetry is introduced into the chromophoric component. Advantageously, one or more of the aromatic groups is substituted with a solubilizing group. The solubilizing group may render the chromophoric component soluble in both the polymer matrix and in the medium used for processing. This is particularly useful where the chromophoric component is blended with the polymer matrix.

Most preferably, the chromophoric component comprises a stilbene or a distyrylbenzene. Various substituents may be incorporated on the ring of the $Ar_1$ moiety of the stilbene or distyrylbenzene to render the molecule asymmetric. Whilst 2,5 substitution using a t-butyl group and a methoxy group as substituents has been found to work well (see the Examples which follow), various other substituents may be used with these and other chromophoric components. For example, long chain solubilizing groups such as alkoxy, aryl, alkyl or polycyclic groups may be used, preferably with a chain length in the range $C_4$ to $C_{22}$.

Where the chromophoric component is covalently attached to the polymer matrix, it is advantageous to use a non-conjugated spacer between the polymer matrix and the chromophoric component. The spacer preferably comprises a carbon chain of at least two carbon atoms, more preferably around 6 carbon atoms. Use of the spacer normally gives the advantage of improved processibility and solubility.

In this embodiment, it is preferred that the polymer matrix comprises a poly(methylmethacrylate). Poly(arylene-1,2-ethanediyl) copolymers may also be used as the polymer matrix.

In a further embodiment of the present invention, the chromophoric component forms at least part of a chromophoric polymer and is blended with the polymer matrix. Preferably, the chromophoric polymer comprises a poly (paraphenylene). It may also be advantageous to include in the blend of chromophoric polymer and matrix polymer an electron transfer agent to help in transferring electrons to the chromophoric polymer. Such electron transfer agents include oxadiazoles, triazoles and other aromatic compounds or polymers having a high electron affinity.

Preferably, the poly(paraphenylene) has the general formula I:

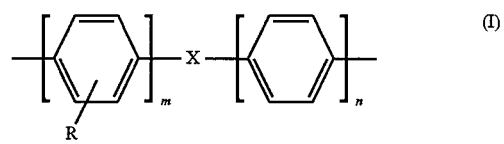
(I)

in which m is an integer and n is an integer or zero, and R represents up to four solubilizing groups. X is optionally present in the polymer and is a non-conjugated spacer, such as defined above. Advantageously, the poly(paraphenylene) has the general formula (II):

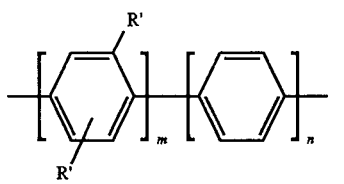

(II)

in which R' represents an alkyl or alkoxy group. More preferably, R' represents $C_6H_{13}O$ and either m is an integer and n is zero or m:n=2:1.

Whether the chromophoric component comprises a small molecule or a part of a chromophoric polymer, the polymer matrix preferably comprises poly(methylmethacrylate), poly carbonate or polystyrene.

In a further aspect, the present invention provides an electroluminescent device incorporating an emissive layer comprising a processible polymer matrix and a chromophoric component, in which the chromophoric component is in the main chain of the polymer matrix and is selected to emit radiation in the region 400 nm to 500 nm when excited to luminesce, wherein the chromophoric component comprises a stilbene or distyrylbenzene moiety.

Preferably, the stilbene or distyrylbenzene moiety includes a non-conjugated spacer region as part of the polymer main chain so as to interrupt the conjugation in the polymer main chain. The stilbene or distyrylbenzene moiety may be substituted as discussed above.

In a further aspect, the present invention provides an electroluminescent device incorporating an emissive layer comprising a processible polymer which comprises a polymeric chromophoric component of general formula (I), as described above, in which m is an integer, n is an integer or zero and R represents up to four solubilizing groups. The polymeric chromophoric component is selected to emit radiation in the region 400 nm to 500 nm when excited to luminesce. Preferably, the polymeric chromophoric component comprises the polymer of general formula II, as described above, in which R' represents an alkyl or alkoxy group. More preferably, R' represents $C_6H_{13}O$ and either m is an integer and n is zero or m:n=2:1. In one embodiment, the polymer may be blended with an electron transfer agent, such as PBD. Alternatively, the polymer can form the emissive layer adjacent a polymeric hole transport layer, such as PPV.

The first approach in this investigation was to form a dispersion of stilbene in PMMA. From theoretical considerations it is known that at least 30% of the dispersion has to be the active chromophore. The device also requires the formed film to be clear with no crystallites at all or, alternatively, with an even distribution of crystallites. This could not be achieved with stilbene in PMMA. A range of concentrations of stilbene in PMMA was investigated, but it was not possible to form films without crystallises of the required thickness for a device by spin-coating from chloroform.

Comparison of stilbene with (1) showed several important differences. First, stilbene has a high degree of symmetry commared with (1) which gives it a greater tendency of packing and thus promotes the formation of crystallites. Second, (1) has a large lipophilic tert-butyl group which makes it more compatible with PMMA and which is not present in stilbene. Finally, the tert-butyl group on (1) decreases the ability of the molecules to stack closely together. Therefore in was decided co develop a stilbene (2) with decreased symmetry and a solubilizing tert-butyl group.

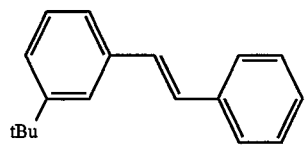

(2)

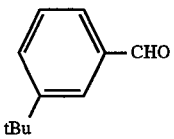

(3)

However, the required aldehyde (3) could not be easily obtained from commercially available starting materials and therefore it was decided to synthesis stilbene (4) (Scheme 1). The first step consisted of a Friedel-Crafts atkylation of o-anisaldehyde using aluminium chloride and tert-butylchloride.

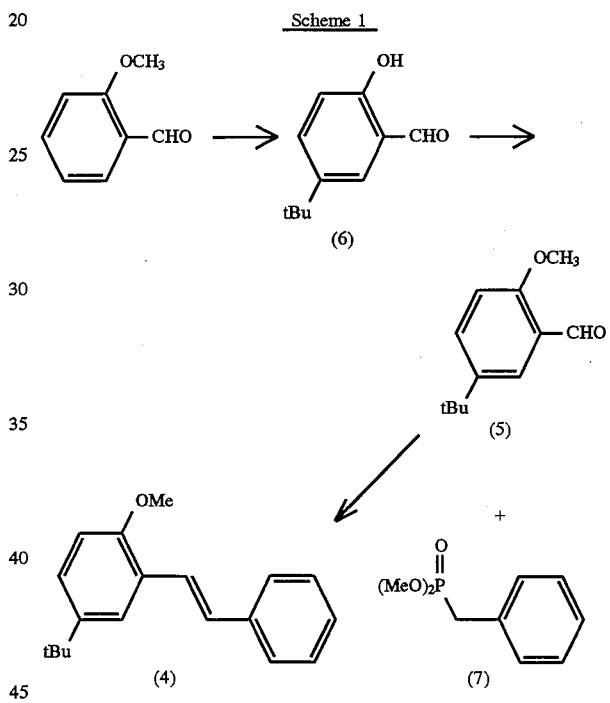

Scheme 1

Under these conditions the aldehyde (6) was obtained in 40% yield. This is the result of a demethylation reaction caused by the alumininium chloride in an analogous fashion to that which can be achieved with boron trichloride. The aldehyde (5) was prepared from (6), tenra-t-butylammonium hydroxide and methyl iodide in dimethylformamide (DMF). The aldehyde (5) was coupled with the phosphonate (7) using sodium hydride as base in DMF. The stilbene (4) was isolated in 71% yield. The absorption spectrum of stilbene (4) is shown in FIG. 1.

Evaluation of (4) as a dispersion in PMMA in an electroluminescent device (Example 1) showed two important points. First, emission was achieved in the violet region, and second, the stability of the devices was not high. Such lack of stability appeared to be due to the poor quality films formed by spin-coating of the dispersion from a chloroform solution which we attribute no the mobility-of the stilbene and its ability to trap solvent. The current-voltage characteristics (FIG. 2) indicate a turn-on voltage of ca. 8V for a device having a 100 nm thick light-emitting layer. The luminance of a test device was fairly proportional to the current as shown by FIG. 3.

To improve the performance it was decided to synthesise distyrylbenzene (8). (Scheme 2) which should give emission at a longer wavelength, be a solid and have the required lack of symmetry and the necessary polymer compatibility. The first step in the synthesis of (8) was the reduction of (5) with lithium aluminium hydride under standard conditions to give the alcohol (9) in 82% yield. The alcohol (9), dissolved in 1,4-dioxane, was treated with concentrated hydrochloric acid to yield (10) in 89% yield. The chloride (10) was converted into the phosphonane (11) in 55% yield by treatment with trimethyl phosphite at reflux. The phosphonate (11) was coupled with 4-stilbenecarbaldehyde (12) under the same conditions used to form (4) and the distyrylbenzene (8) was isolated in 73% yield.

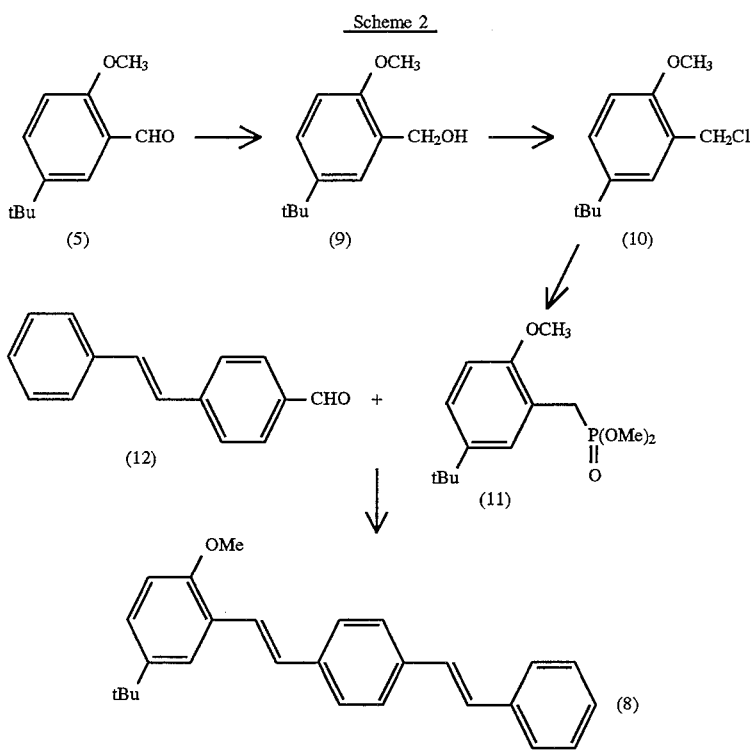

Scheme 2

Evaluation of a dispersion of (8) in PMMA in an electroluminescent device showed that the emission was indeed blue (Example 2). The films formed by spin-coating from a chloroform solution were still not of the required quality. However, dispersions of (8) in crosslinked PMMA formed high quality uniform films when spun from chloroform solutions and these have been evaluated in electroluminescent devices. The absorption spectrum of (8) is shown in FIG. 4. For comparison its photoluminescence (PL) spectrum can be seen in FIG. 5. FIG. 6 shows that the average electroluminescence spectrum is comparable to the average photoluminescence spectrum. The current-voltage characteristics (FIG. 7) indicate a turn-on voltage of ca. 20V for an electroluminescent layer of 250 nm thickness. The luminance of a test device was fairly proportional to the current (FIG. 8).

A much more stable and efficient device was constructed using polystyrene as the binder (50% w/w). This showed efficiencies of over 1% with a turn-on voltage of 15V (FIG. 14).

From this work we have shown that it is possible to achieve electroluminescence from a molecular conjugated unit in a polymer binder by judicious design of the chromophore in doing so we have defined some of the parameters of the active chromophore. The experience gained from the design of molecular blue light-emitting dyes which were dispersed in a blend with PMMA and used in EL devices was now applied to the design of suitably substituted side chain polymers. It is long known from work on polymers which exhibit second order susceptibilities, $\chi^{(2)}$, that dyes can be attached as side chains on a poly(methacrylate). For practical reasons the aromatic substituents, which for $\chi^{(2)}$ systems are of push-pull type, cannot be directly linked to the ester group in methacrylate. A spacer is usually inserted in between to improve solubility and processability of the final polymer. Although such polymers are known for applications in non-linear optics, the idea of designing electroluminescent polymers with fluorescent side-chains is new. Our strategy involved a suitably substituted stilbene or distyrylbenzene with a flexible spacer being connected to methacrylate and being polymerised we aimed to apply such fluorescent polymers as blue light-emitting layers in electroluminescent devices.

Our first example of an electroluminescent polymer was a poly(methacrylate) with a stilbene side chain. Stilbene itself would not be of much use because its fluorescence emission maximum is expected to be in the ultraviolet. Three alkoxy substituents were incorporated to shift it towards the visible part of the spectrum. The substitution pattern (2', 5', 4) was chosen to ensure lack of symmetry in the stilbene which usually results in increased solubility of the molecular compounds and the final polymer. The synthesis was straight forward as outlined by Scheme 3.

Scheme 3

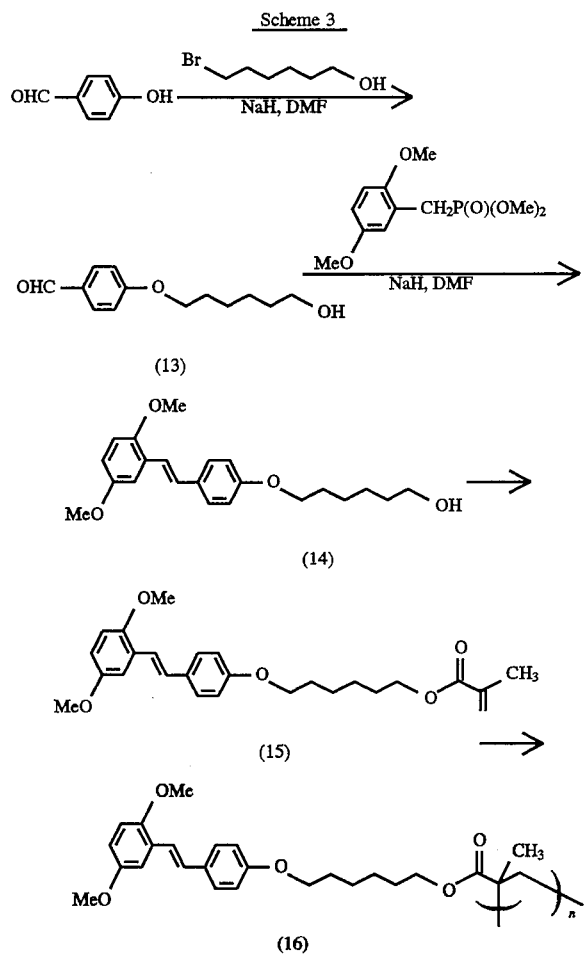

The known aldehyde (13) was obtained from p-hydroxybenzaldehyde and 6-bromohexane in 45% yield. A Witrig-Horner reaction with dimethyl 2,5-dimethoxybenzylphosphonate then furnished the alcohol (14) in 47% yield which functioned as the fluorescent dye already connected to a flexible hexamethylene spacer group. Esterification with methacryloyl chloride gave the monomer (15). Radical polymerisation then yielded a substituted poly(methacrylate) (16) which was purified by reprecipitation.

The film forming properties of polymer (16) were good. It was successfully tested as a light-emitting polymer in an electroluminescent device (Example 3). Devices were however short-lived and the light output faded away rather rapidly despite the bathochromic substituents the emitted light was violet as expected from the model compound studies.

To shift the fluorescence maximum to longer wavelengths, the conjugated system was extended in a second attempt to a distyrylbenzene system which was shown in our model compound studies to exhibit blue fluorescence. This time one methoxy group on the aromatic system was substituted by a tert-butyl group to act as a solubilising group. The synthesis is outlined in Scheme 4.

Scheme 4

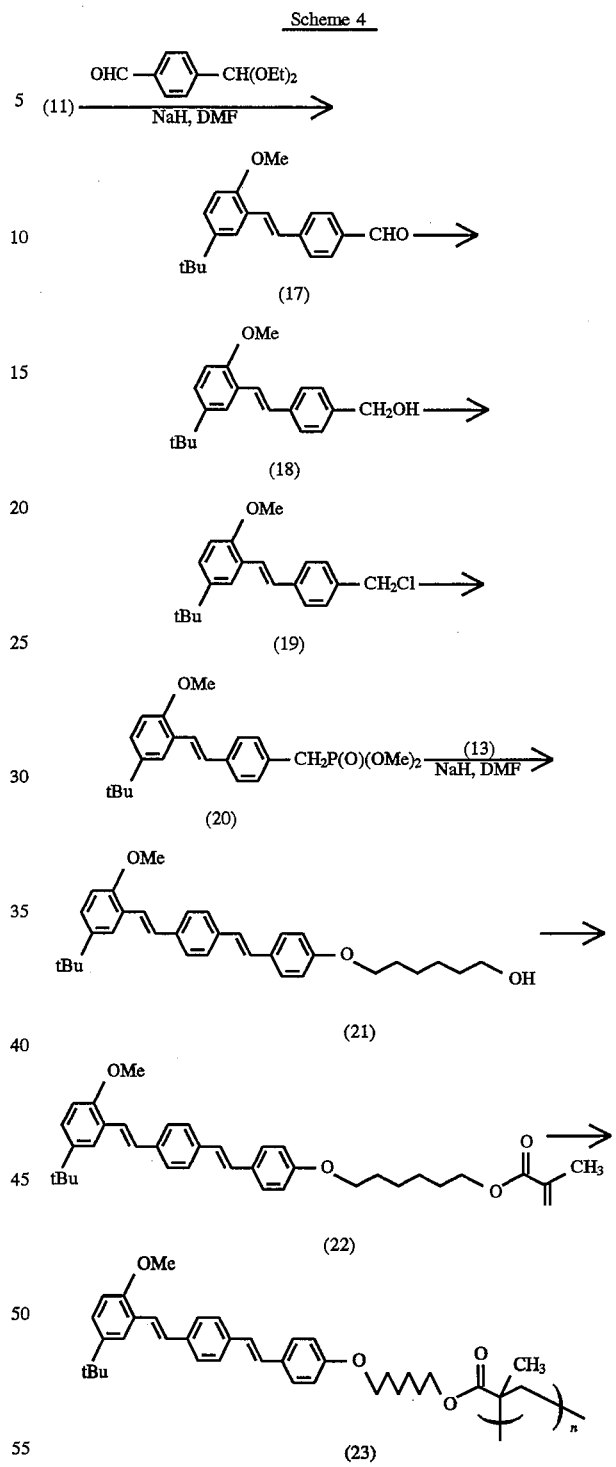

The extension of the conjugated system was achieved as before by Wittig-Horner type chemistry. Hence, phosphonate (11) and terephthaldehyde nomo(diethyl acetal) gave aldehyde (17) in 69 yield. Subsequently, the aldehyde was reduced, the alcohol obtained transformed to the chloride and the chloride reacted with trimethyl phosphite to give phosphonate (20) in 21% overall yield. Coupling with (13) furnished alcohol which was esterified with methacryloyl-chloride. Polymerisation of monomer (22) was again conducted in toluene using a radical initiator (AIBN). This resulted in polymer (23) which fluoresced blue both in solution and in the solid state. The polymer was separated into two fractions by fractionated precipitation with ether/dichloromethane. The more soluble fraction proved to have an appreciable nitrogen content (0.27%) originating from the AIBN initiator and indicated a moderate molecular weight. The remaining fraction was too insoluble to be of any use. The absorption spectrum of (23) (FIG. 9) was almost identical to distyrylbenzene (8) (FIG. 4).

Polymer (23) exhibited blue fluorescence in the solid state and was used as the light-emitting layer in an electroluminescent device (Example 4). An ITO/polymer/calcium device showed a blue-violet light emission which decayed rapidly. The quantum efficiency of a test device was ca. 0.007%. The current-voltage characteristics (FIG. 10) indicate a turn-on voltage of ca. 30V for an electroluminescent layer of 300 nm thickness. The luminance of a test device was again fairly proportional to the current (FIG. 11).

Another route to a blue emitting polymer involves incorporation of the chromophore into the polymer main chain. Prior art for polymers of this type is "New thermotropic polyesters from distyrylbenzene hisphenols" by T. E. Mates and C. K. Ober, J. Polym. Sci., Polym. Lett., 1990, 28,331. The authors describe the synthesis of such a polymer and anticipate applications in nonlinear optics, however, not in electroluminescence. A similar fluorescent distyrylanthracene main chain polyester with liquid crystalline behaviour has been disclosed in Jpn. Kokai Tokk-yo Koho JP 02/117, 915 (Mitsubishi Petrochemicals). The only example so far of an electroluminescent main chain nonconjugated polymer has been reported by C. Hosokawa, N. Kawasaki, S. Sakamoto and T. Kusumoto in "Bright blue electroluminescence from hole transporting polycarbonate" in Appl. Phys. Left. 1992, 61, 2503. Purplish blue light emission was observed from a 4,4'-diphenylaminostilbene chromophore in a polycarbonate main chain polymer.

Benzene-1,4-dimethanol was mono-silylated to give alcohol (24). Swern oxidation yielded aldehyde (25) which was converted to disilyl-protected distyrylbenzene (27) by Wittig reaction using bis-phosphonium salt (26). Deprotection was achieved with tetra-n-butylammonium fluoride. Diol (28) was reacted with redistilled sebacoyl chloride to give polymer (29) which was purified by precipitation into hexane and into methanol. Elemental analysis and NMR spectra suggested that the material prepared was an oligomer with ca. six repeating units (Example 5). Much higher molecular weights are likely to be obtained under slightly different polymerisation conditions. The solution absorption spectrum of polymer (29) is shown in FIG. 12. The photoluminescence spectrum of polymer (29) varied from blue in dilute solution to blue-green in a thin film. The large Stokes shift suggests that the chromophore groups interacted significantly in the solid state. This might be counteracted by the addition of bulky substituents on the phenylene rings. As the melting point of the polymer was over 90° C., it was possible to nest it in an electroluminescent device. The electroluminescent device efficiency was about 0.01%. The light output faded rapidly, Though recovered on resting the device.

Scheme 5

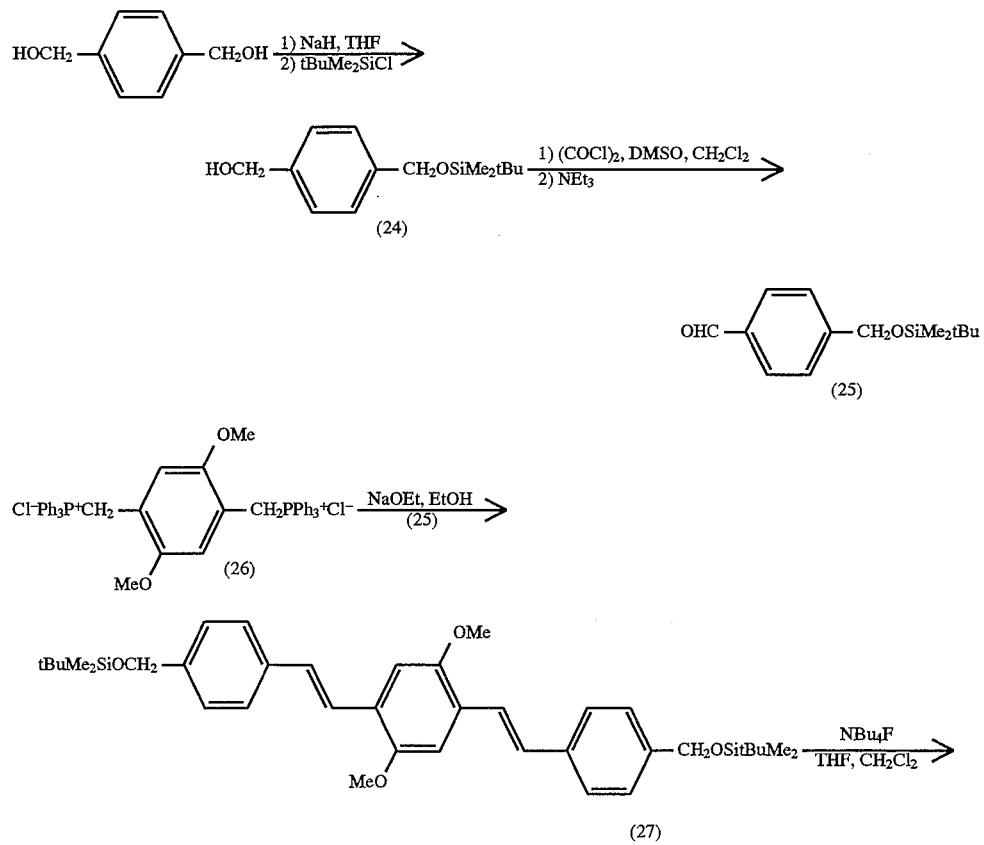

-continued
Scheme 5

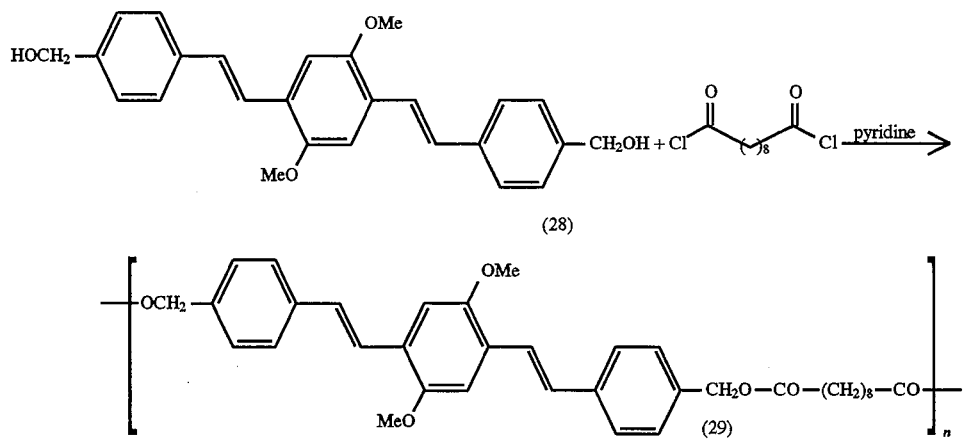

J. M. Machado, F. R. Denton, J. B. Schlenoff, F. E. Karasz and P. M. Lahti have shown in "Analytical methods for molecular weight determination of poly(p-xylylidene dialkyl sulfonium halide): degree of polymerisation of poly (p-phenylene vinylene) precursors", J. Polym. Sci., Polym. Phys., 1989, 27, 199 that sodium thiophenolate completely substitutes sulfonium groups in the tetrahydrothiophenium precursor polymer to PPV, (30), to furnish a polymer (31) which is soluble in chlorinated solvents. Similar observations have been made by R. A. Wessling and R. G. Zimmerman (Dow Chemical Co.), U.S. Pat. No. 3,404,132. Their disclosure also describes that the resulting polymer shows intense blue fluorescence. We repeated the results (Scheme 6) and confirmed the observation. However, the polymer (31) failed to produce electroluminescence in a standard EL device likely due to insufficient conjugation.

Scheme 6

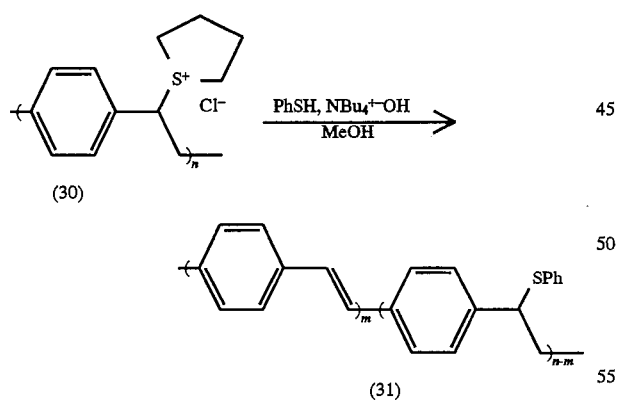

That thiolates can react as modifier groups with precursor polymers to PPV is also disclosed in PCT/WO92/03490 and in PCT/WO92/03490. What is now anticipated, however, is the possibility that the thiolate can itself be a fluorescent dye. This would permit the preparation of a novel class of side-chain polymers.

The following scheme shows examples which form part of this invention.

Scheme 7

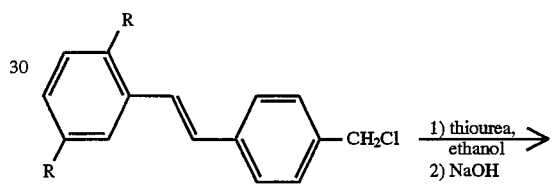

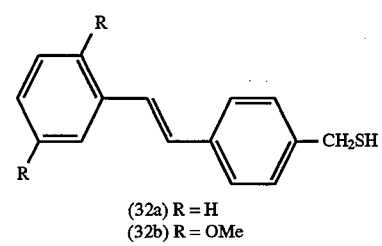

(32a) R = H
(32b) R = OMe

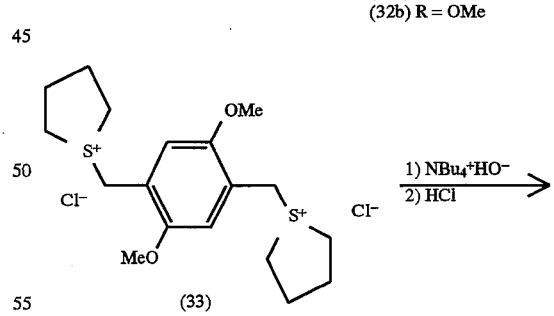

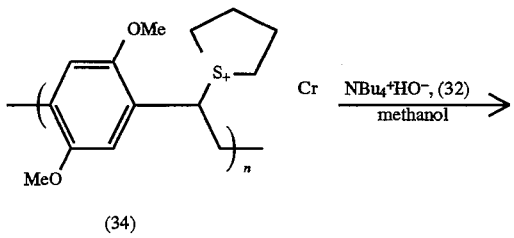

-continued
Scheme 7

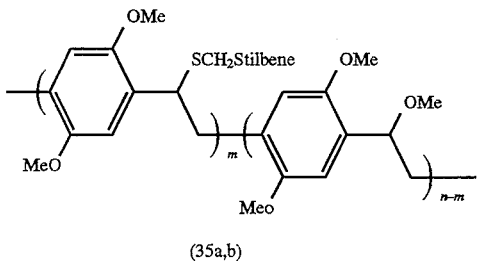

(35a,b)

Thiols (32a,b) were prepared by a standard procedure. Bis-sulfonium salt (33) was polymerised with cetra-t-butylammonium hydroxide in methanol to give the sulfonium precursor polymer to poly(2,5-dimethoxy-o-phenylenevinylene), (34). A solution of equimolar amounts of base and thiol (32a) or (32b), respectively, was then added resulting in two polymers (35a,b) which contained the fluorescent stilbene as a side chain (Examples 7–8). An $^1$H NMR spectrum of the polymer obtained from (32b) indicated that only 15–25% of the stilbene was incorporated. IR, UV, and photoluminescence experiments were carried out showing that the stilbene was in fact present. No electroluminescence was observed presumably due to the low concentration of electroactive species. This is again in accordance to our statement on p. 2 emphasising that theoretically at least 30% of the active chromophore in the polymer binder are necessary. The low percentage obtained in the above case is basically due to the fact that the highly reactive sulfonium precursor polymer to poly(2,5-dimethoxy-p-phenylenevinylene) had been used.

Instead the sulfonium precursor polymer to PPV (36) was employed, which allowed much better control of the substitution reaction (scheme 8, FIG. 18). The resulting polymer (37) showed blue fluorescence in solution.

Another class of polymers that show promise for blue emission is the poly(p-phenylenes). The insoluble, unsubstituted poly(p-phenylene) has been shown to luminesce in the blue region as described previously. Soluble versions were prepared via palladium-catalysed coupling reactions (scheme 9, FIG. 18). These new polymers showed good blue fluorescence and were used in a variety of EL devices. A device using a blend of polymer (41) in polystyrene in a configuration ITO/polymer blend/Ca had an excellent efficiency of ca. 1% although the driving voltage was high (70–90V). By using more of the phenylene polymer in the blend and employing a bilayer structure (ITO/PPV/polymer blend/Ca) the driving voltage could be reduced to 50V, although the PPV layer absorbed some light. A 1:1 mixture of the polymer (42) with the oxadiazole (43) resulted in much lower driving voltages (10V) but the device decayed rapidly.

BRIEF DESCRIPTION OF THE DRAWINGS

FIG. 18 shows reaction schemes which are the subject of examples 9 and 10.

EXAMPLE 1

Preparation of 2-hydroxy-5-tert-butylbenzaldehyde (6)

Figure 1:
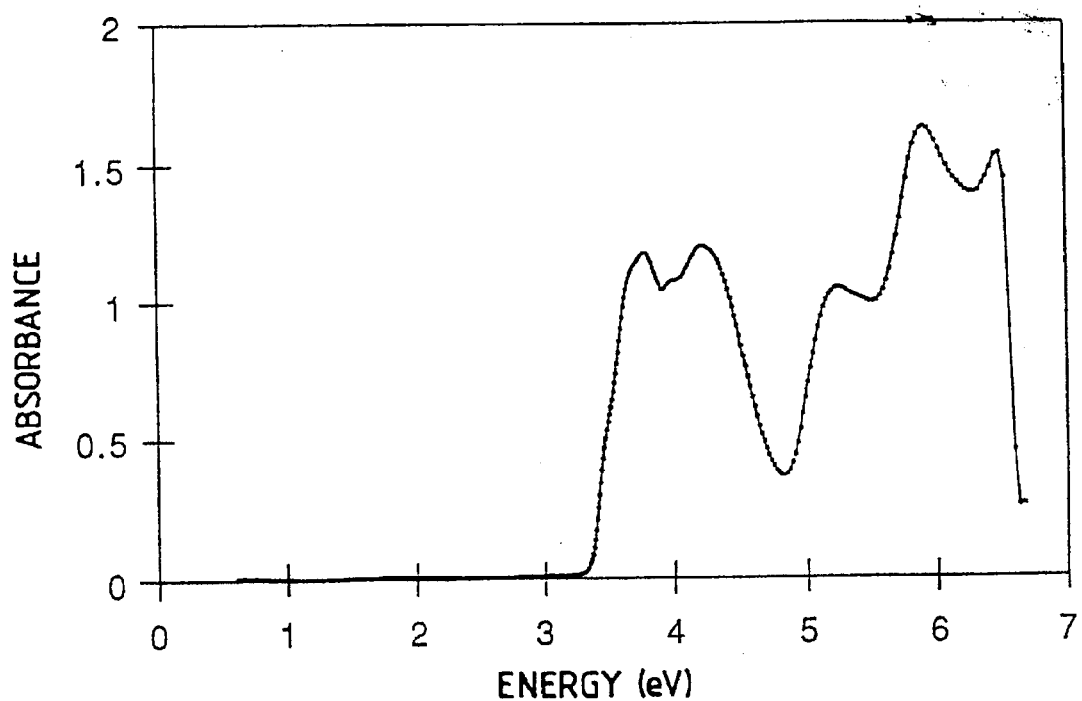
FIG. 1 is a graph showing the absorption spectrum of 2-methoxy-5-mert-butylstilbene
Figure 2:
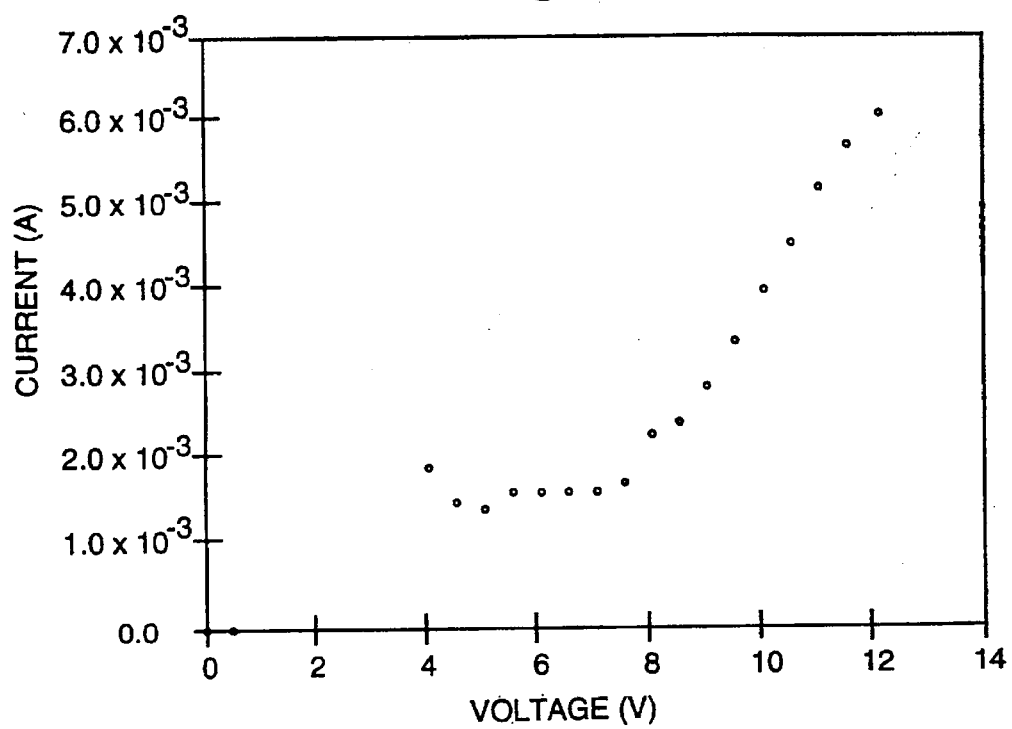
FIG. 2 is a graph showing the current/voltage characteristics of a thin film of 2-methoxy-5-tert-butylstilbene (4) and PMMA.
Figure 3:
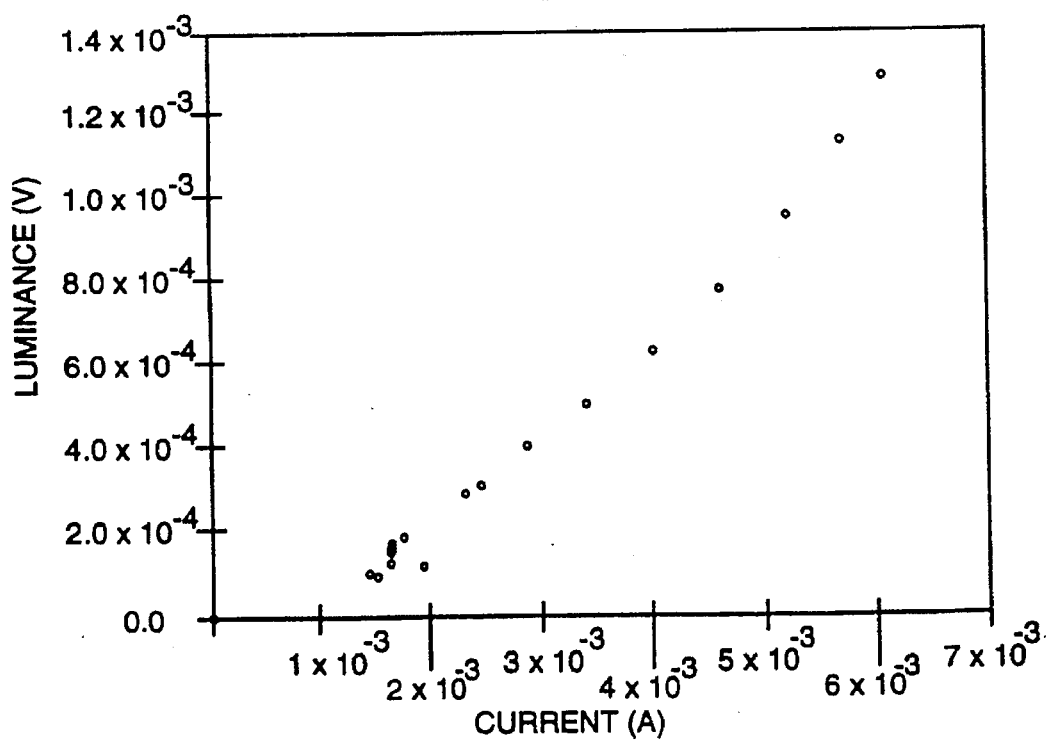
FIG. 3 is a graph showing the luminance/voltage characteristics of a thin film of 2-methoxy-5-tert-butylstilbene (4) and PMMA.
Figure 4:
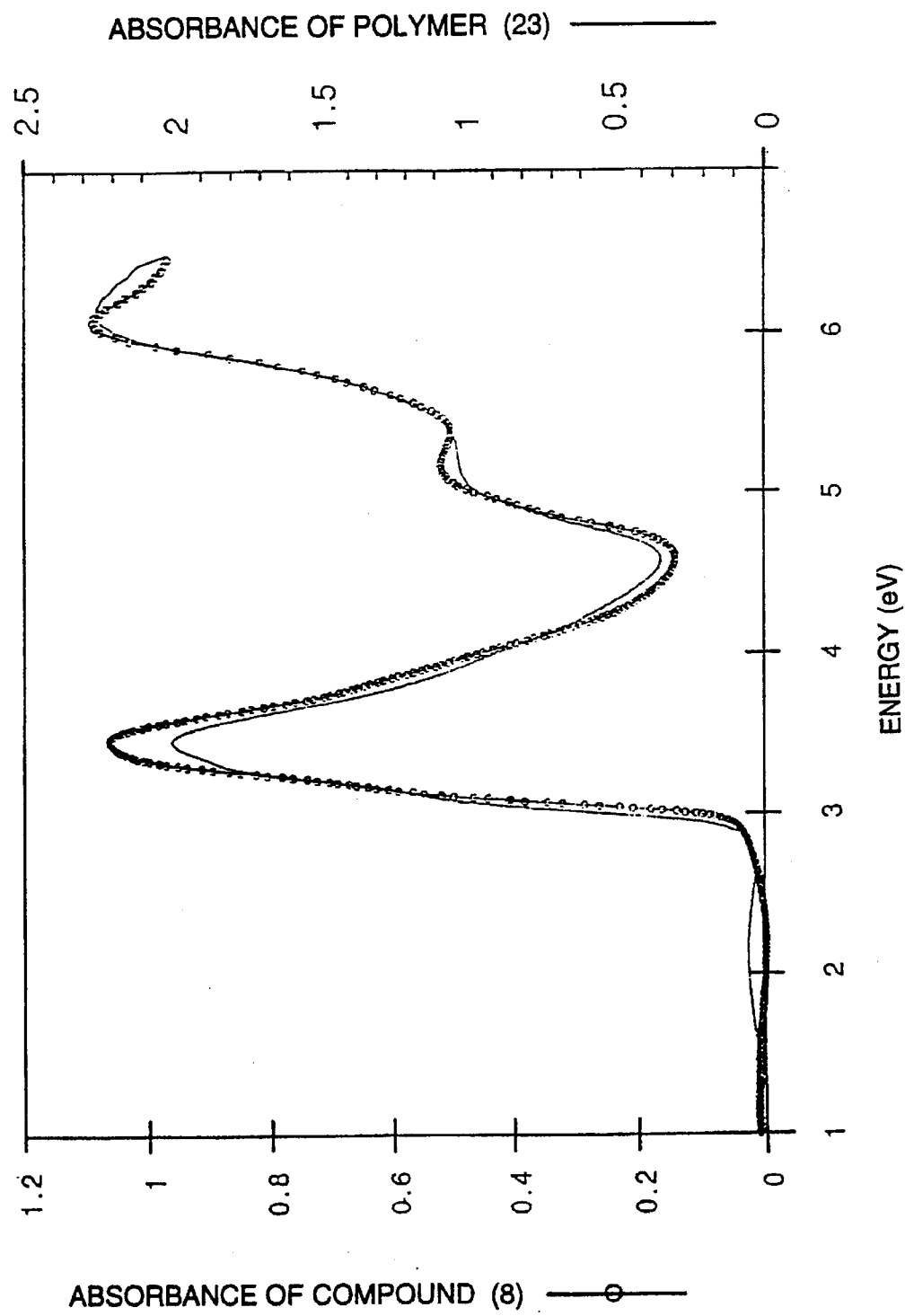
FIG. 4 shows the absorption spectrum of 2-methoxy-5-tert-butyldistyrylbenzene (8) and of polymer (23).
Figure 5:
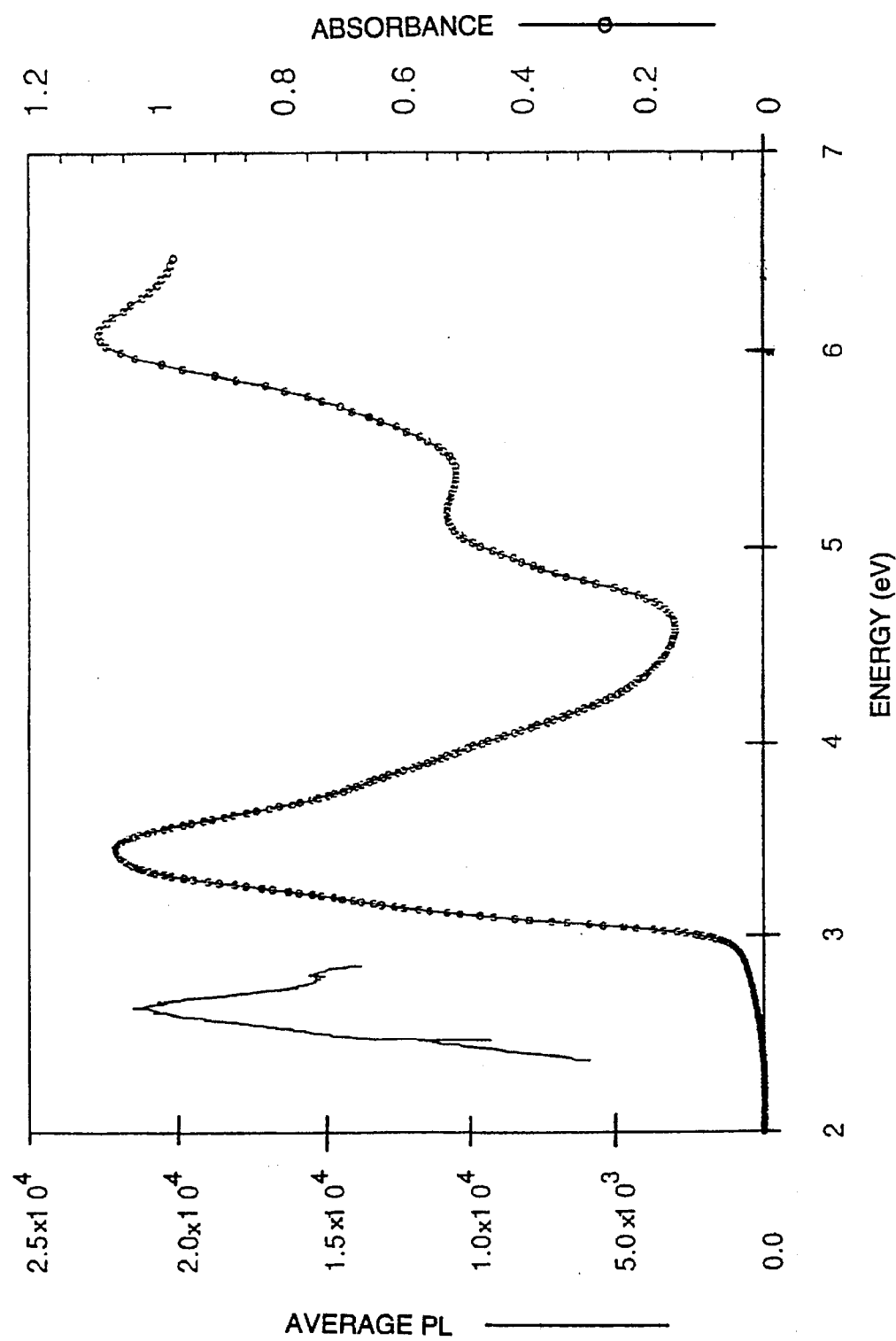
FIG. 5 is a graph showing the absorption and the photoluminescence spectrum of 2-methoxy-5-tert-butyldistyrylbenzene (8).
Figure 6:
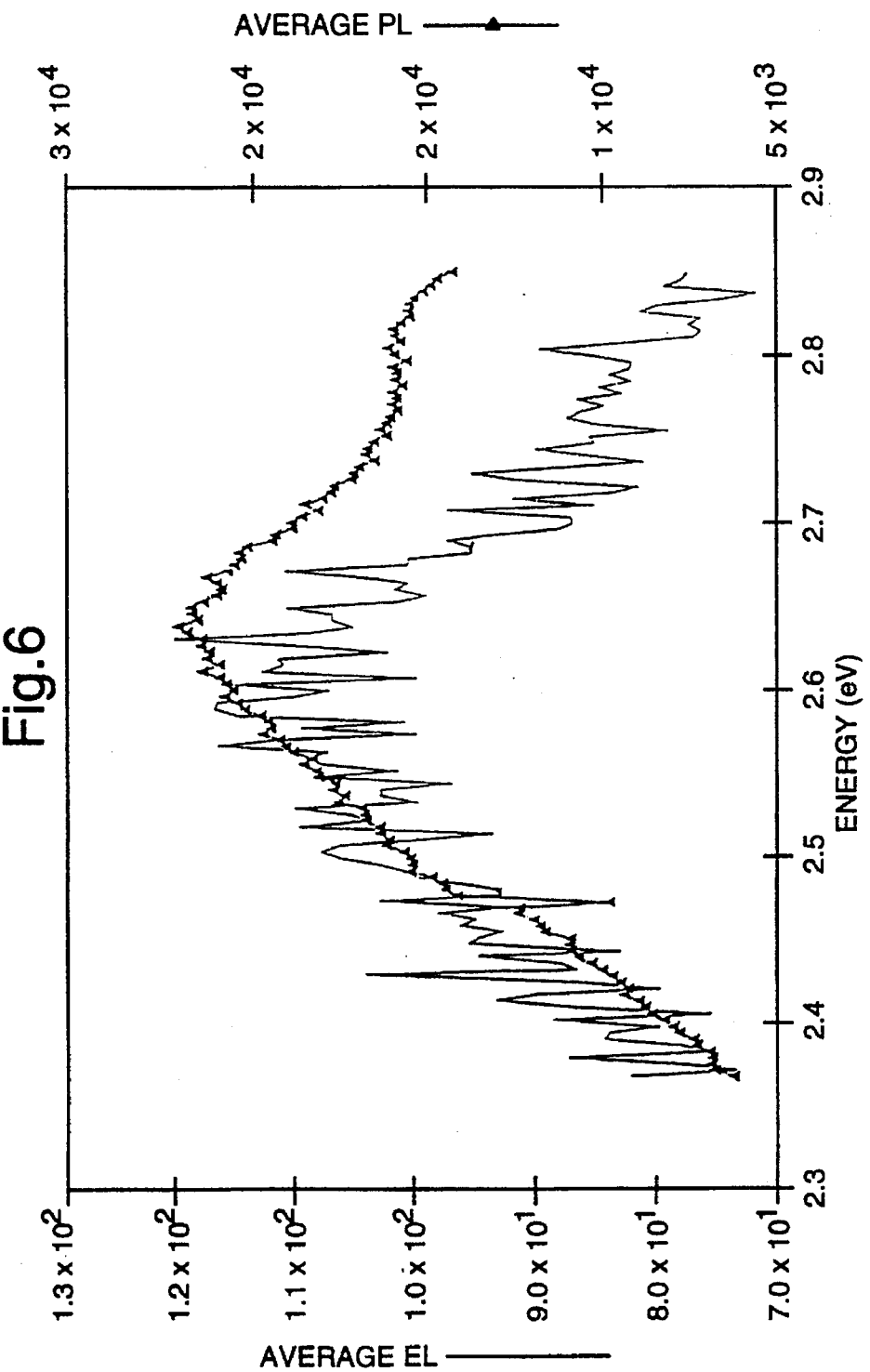
FIG. 6 is a graph showing the average photoluminescence and the average electroluminescence spectrum of a thin film of 2-methoxy-5-tert-butyldistyrylbenzene (8) and PMMA.
Figure 7:
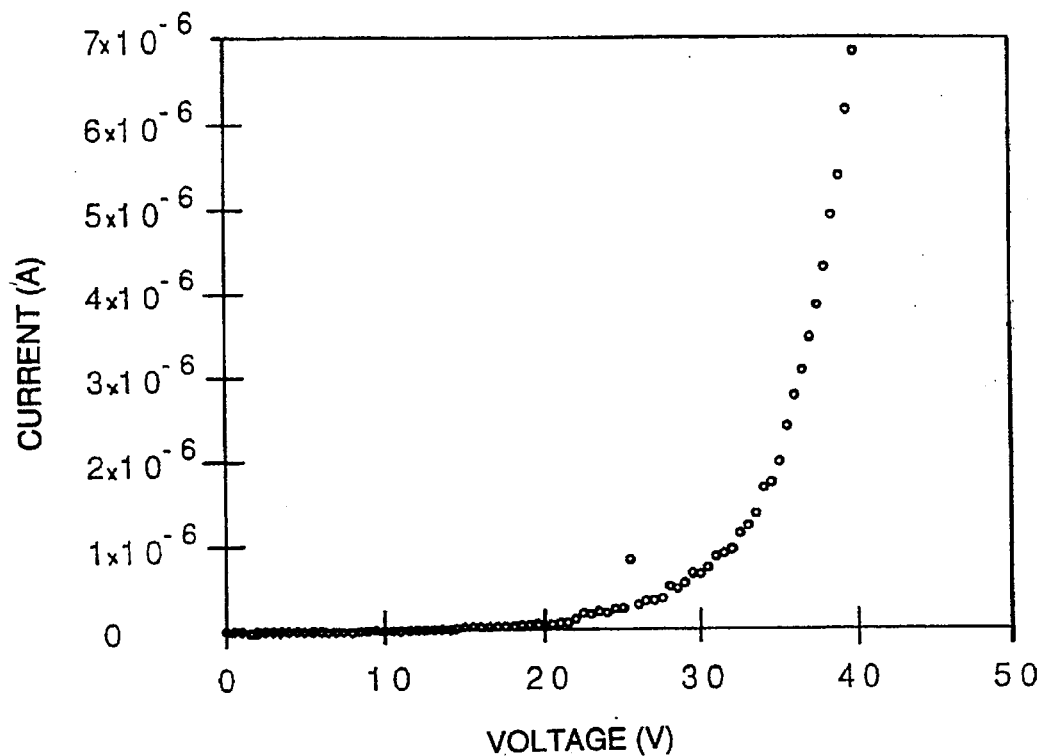
FIG. 7 is a graph showing the current/voltage characteristics of a thin film of 2-methoxy-5-tert-butyldistyrylbenzene (8) and PMMA.
Figure 8:
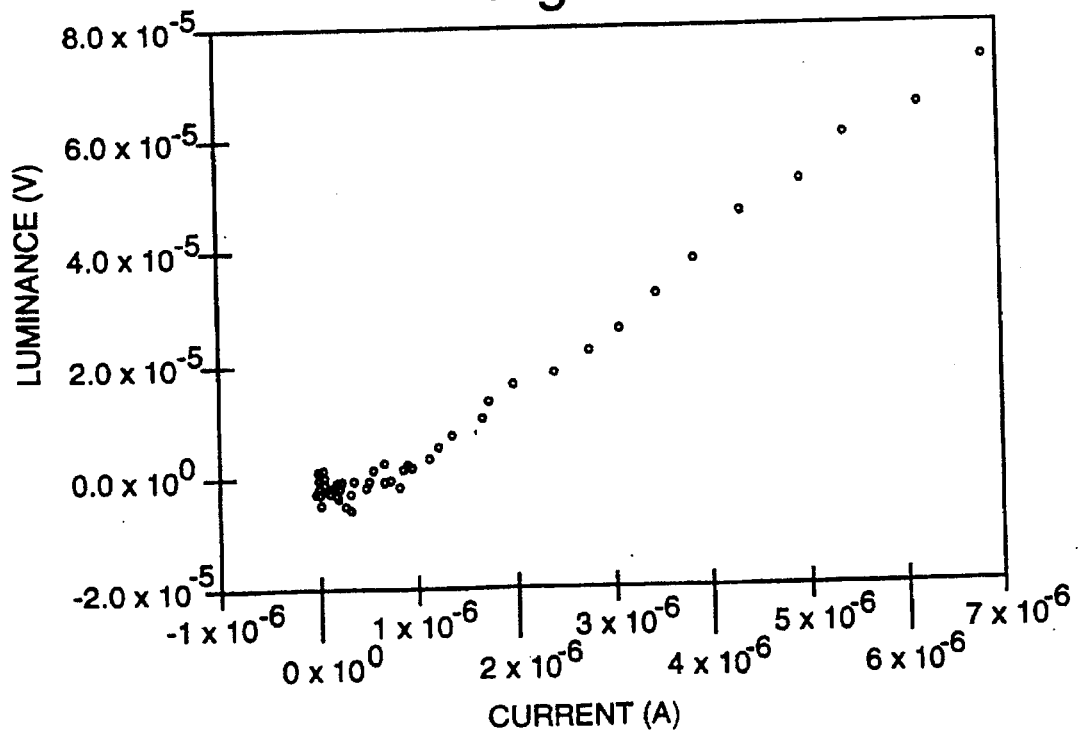
FIG. 8 is a graph showing the luminance/voltage characteristics of a thin film of 2-methoxy-5-tert-butyldistyrylbenzene (8) and PMMA.
Figure 9:
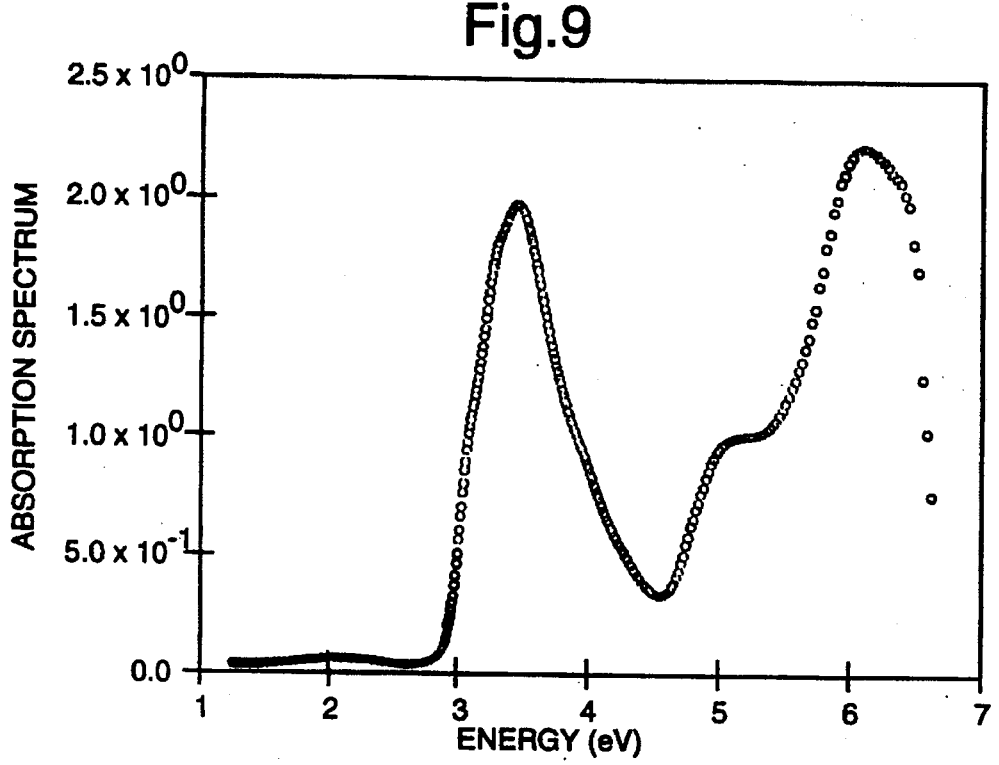
FIG. 9 shows the absorption spectrum of polymer (23).
Figure 10:
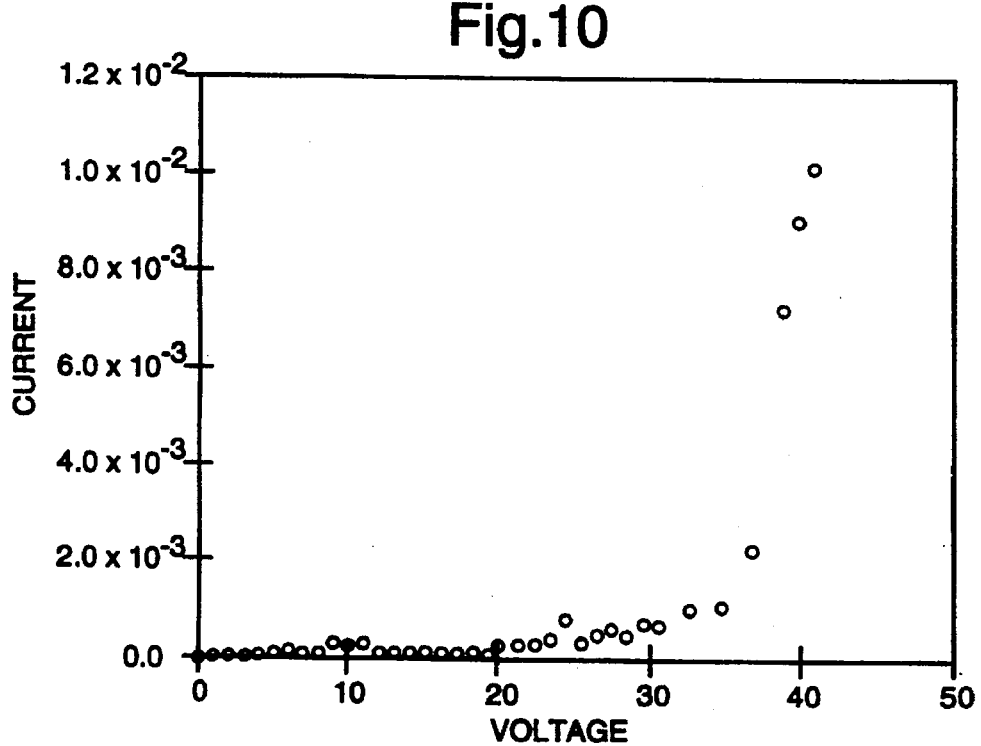
FIG. 10 is a graph showing the current/voltage characteristics of a thin film of polymer (23).
Figure 11:
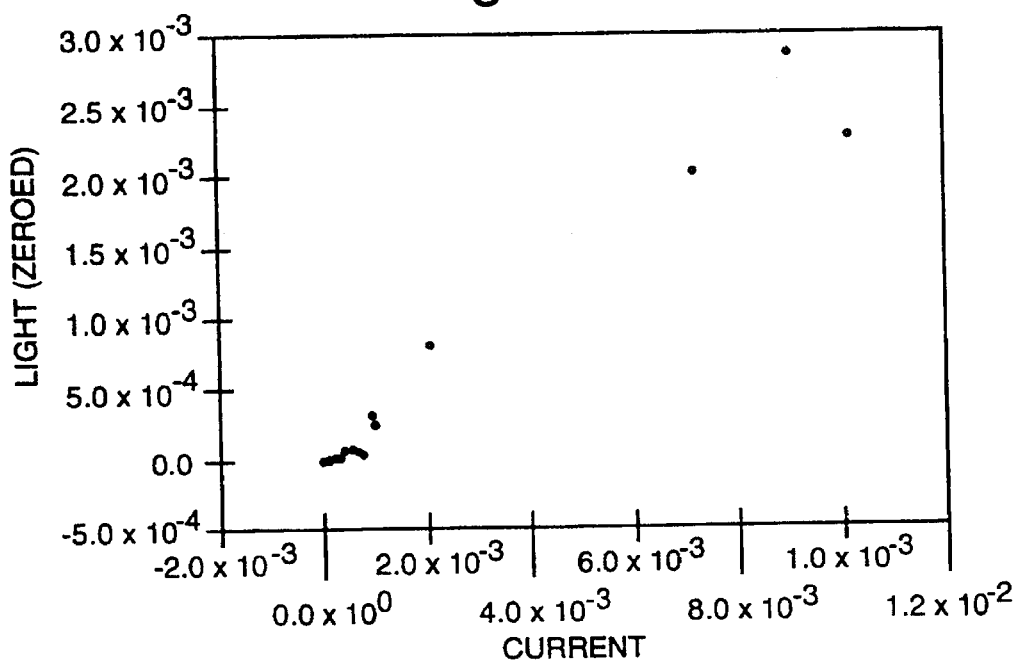
FIG. 11 is a graph showing the luminance/voltage characteristics of a thin film of polymer (23).

To an ice-cold stirred mixture of o-anisaldehyde (50 ml, 326 mmol) and tert-butylchloride (80 ml, 735 mmol) was added aluminum chloride (40 g, 300 mmol). The reaction mixture became thick. Dry dichloromethane (100 ml) and aluminum chloride (60 g, 450 mmol) were added carefully with cooling. Once the reaction became less vigorous the reaction mixture was stirred at room temperature for 2.25 h. Ice (50 g) and subsequently ice-cold water (100 ml) were added carefully and the mixture was left to stir for 20 min. water (250 ml) and ether (550 ml) were added. The aqueous layer was removed and the organic layer was washed with water (3×250 ml), dried over anhydrous sodium sulfate, filtered and concentrated in vacuo. The residue was purified by distillation under reduced pressure and the fraction (b.p. 80°–86° C., 0.55–0.65 mm Hg) collected to yield (6) as a colourless oil (23.4 g, 40%). Preparation of 2-methoxy-5-tert-butylbenzaldehyde (5) To a solution of (6) (5.01 g, 28.1 mmol) in dry DMF (25 ml) was added a solution of tetra-n-butylammonium hydroxide in methanol (1.0M, 28.5 ml, 28.5 mmol). Methyl iodide (25 ml, 399 mmol) was added and the solution was stirred ac reflux for 1.5 h and then allowed to cool. Ether (250 ml) and water (250 ml) were added. The aqueous layer was removed and the organic layer was washed with water (3×250 ml), brine (250 ml), dried over anhydrous sodium sulfate, filtered and concentrated in vacuo. The residue was purified by column chromatography over silica (dichloromethane/petroleum ether [v/v]; 4:1) to yield a colourless oil of (5) (4.36 g, 81%); $\delta H$ (CDCl$_3$) 1.29 (9 H, s, tert-butyl), 3.88 (3 H, s, OCH$_3$), 6.95 (1 H, d, J=8.8 Hz, H3), 7.56 (1 H, dd, J=8.8, 2.7 Hz, H4), 7.83 (1 H, d, J=2.7 Hz, H6), and 10.44 (1 H, s, CHO).

Preparation of 2-methoxy-5-tert-butylstilbene (4)

A suspension of dimethyl benzylphosphonate (7) and sodium hydride (60% in oil, 0.38 g, 9.5 mmol) in dry DMF (39 ml) was cooled with stirring to 6° C. A solution of (5) (1.45 g, 7.54 mmol) in dry DMF (14 ml) was added dropwise keeping the reaction temperature at 5°–7° C. and then the reaction mixture was stirred at room temperature for 3 h under argon. Water (250 ml) and ether (400 ml) were added. The organic layer was separated and washed with water (3×100 ml), brine (50 ml), dried over anhydrous sodium sulfate, filtered and concentrated in vacuo. The residue was purified by column chromatography over silica (dichloromethane/hexane; 1:1) to yield a colourless gum of (2) (1.42 g, 71%), (Found: C, 85.78; H, 8.36. C$_{19}$H$_{22}$O requires C, 85.67; H, 8.33%); $\lambda_{max}$nm(CH$_2$Cl$_2$) 291 (log ε4.26) and 323 (4.25); $\delta H$ (CDCl$_3$) 1.36 (9 H, s, tert-butyl), 3.88 (3 H, s, OCH$_3$), 6.85 (1 H, d, $J_{H4,H3}$=8.6 Hz, H3), 7.13 (1 H, d, J=16.5 Hz, vinyl H), 7.25 (1 H,m, H4'), 7.28 ( 1 H, dd, $J_{H3,H4}$=8.6 Hz, $J_{H6,H4}$=2.3 Hz, H4) 7.36 (2 H, m, H3' and H5'), 7.50 (1 H, d, J=16.5 Hz, vinylic H), 7.56 (2 H, m, H2' and H6'), and 7.61 (1 H, d, $J_{H4,H6}$=2.3 Hz, H6); $\delta_c$ (CDCl$_3$) 31.5 (CH$_3$), 34.1 [C(CH$_3$)$_3$], 55.6 (OCH$_3$), 110.5, 123.5, 124.1, 125.5, 125.6, 126.5, 127.2, 128.5, 128.8, 138.0, 143.2, and 154.85; m/z 266.167.

Preparation of EL device

A solution of PPfMA (0.035 g) and 2-methoxy-5-tert-butylstilbene (4) (0.04 g) in chloroform (5 ml) was prepared. Spin-coating at 2000 r.p.m. gave films with typical thickness of 100 nm. Violet electroluminescence was observed using an ITO/doped PMMA/Calcium device.

EXAMPLE 2

Preparation of 2-methoxy/-5-tert-butylbenzylalcohol (9)

A mixture of 2-methoxy-5-tert-butylbenzaldehyde (5) (2.54 g, 13.2 mmol) and lithium aluminium hydride (0.28 g, 7.4 mmol) in ether (50 ml) was stirred at reflux under nitrogen for 4 h and then allowed to cool. Water (30 ml), hydrochloric acid (3M, 50 ml) and ether (50 ml) were added. The organic layer was separated and washed with water (2×50 ml), brine (50 ml), dried over anhydrous sodium sulfate and concentrated in vacuo. The residue was purified by column chromatography over silica (dichloromethane) to yield a colourless oil of (9) (2.11 g, 82 $\delta H$ (CDCl$_3$) 1.34 (9 H, s, tert-butyl), 3.84 (3 H, s, OCH$_3$), 4.71(2 H, s, CH$_2$), 6.84 (1 H, d, J=8.5 Hz, H3), 7.31 (1 H, dd, J=8.5, 2.5 Hz, H4), and 7.36 (1 H, d, J=2.5 Hz, H6).

Preparation of 2-methoxy-5-tert-butylbenzylchloride (10)

A solution of 2-methoxy-5-cert-butylbenzylalcohol (9) (1.91 g, 9.83 mmol) in 1,4-dioxane (20 ml) was added to hydrochloric acid (10 M, 43 ml). The reaction mixture was stirred for 10 min at room temperature. Ember (250 ml) and water (150 ml) were added. The organic layer was separated and washed with water (4×50 ml), dried over anhydrous sodium sulfate, filtered and concentrated in vacuo. The residue was purified by column chromatography over silica (dichloromethane/hexane; 1:1) to yield (10) (1.85 g, 89%). The $^1$H NMR spectrum was consistent with that reported by M. Taskits, T. Yamatc and G. Fukata, J. Org. Chem., 1978, 43, 1413.

Preparation of dimethyl 2-methoxy-5-tert-butylbenzylphosphonate (11)

A solution of 2-methoxy-5-butylbenzylchloride (10 (1.65 g, 7.76 mmol) in trimethyl phosphite (25 ml) was heated at reflux for 22 h under argon. The excess trimethyl phosphite was distilled off under reduced pressure and the residue was purified by column chromatography over silica (dichloromethane/methanol; 49:1), by distillation under reduced pressure (b.p. 215° C. at 0.075 mm Hg) and finally by column chromatography over silica (dichloromethane/methanol; 19:1) to yield a colourless oil of (11) (1.21 g, 55%); $^{67}$H (CDCl$_3$) 1.33 (9 H, s, tert-butyl), 3.17 (2 H, d, J=21.8 Hz, CH$_2$P), 3.64 (3 H, s, OCH$_3$), 3.69 (3 H, s, OCH$_3$), 3.86 (3 H, s, Ar-OCH$_3$), 6.83 (1 H, d, J=8.6 Hz, H3), 7.08 (t H, d, J=16.4 Hz, vinylic H), 7.24, 7.29, 7.41, 7.48, and 7.50 (5 H, m, PhH and vinylic H), and 7.57 (1 H, d, J=2.4 Hz, PhH).

Preparation of 2-methoxy-5-tert-butyldistyrylbenzene (8)

A suspension of dimethyl 2-methaxy-5-tert-butylbenzylphosphonate (11) (1.01 g, 3.53 mmol) and sodium hydride (60% in oil, 0.17 g, 4.25 mmol) in dry DMF (29 ml) was cooled with stirring co 6° C. under argon. A solution of 4-stilbenecarbaldehyde (12) (0.88 g, 4.23 mmol) in dry DMF (21 ml) was added dropwise with stirring keeping the reaction temperature at 5° C. and then the reaction mixture was stirred at room temperature for 3.75 h under argon. Water (100 ml) and ether (300 ml) were added. The organic layer was separated, washed with water (3×100 ml), dried over anhydrous sodium sulfate, filtered and concentrated in vacuo. The residue was purified by column chromatography over silica (dichloromethane/hexane; 1:1) and recrystallised from dichloromethane/hexane/methanol to yield a pale yellow solid of (8) (0.95 g, 73%), m.p. 129°–129.5° C.; (Found: C, 88.06; H, 7.62. C$_{27}$H$_{28}$O requires C, 88.00; H, 7.66%); $\lambda_{max}$/nm (CH$_2$Cl$_2$) 362 (log ε 4.72); 8H (CDCl$_3$) 1.36 (9 H, s, tert-butyl), 3.88 (3 H, s, OCH$_3$), 6.85 (1 H, d, $J_{H4,H3}$=8.6 Hz, H3), 7.13 (1 H, d, J=16.5 Hz, vinytic H), 7.125 (1 H, s, vinytic H), 7.26 H, m, H4"), 7.28 ( 1 H, dd, $J_{H4}$=8.6 Hz, $J_{H6,H4}$=2.44 Hz, H4), 7.37 (2 H, m, H3" and H5"), 7.53 (7 H, m, H2", H6", H2', H3', H5', H6', and vinylic H), 7.56 (2 H, m, H2' and H6') and 7.62 (1 H, d, $J_{H4,H3}$=2.4 Hz, H6); $\delta_C$ (CDCl$_3$) 31.5 (CH$_3$), 34.1 [C(CH$_3$)$_3$], 55.6 (OCH$_3$), 110.5, 123.5,124.0, 125.6, 126.5, 126.7, 126.8, 127.5, 128.2, 128.4, 128.7, 136.3, 137.4, 137.5, 143.3 and 154.8; m/z 368.214.

Preparation of EL devices

A solution of PMMA (0.036 g) and 2-methoxy_-5-tert-butyldistyrylbenzene (8) (0.036 g) in chloroform (5 ml) was prepared. Spin-coating at 2000 r.p.m. gave films with typical thickness of 250 nm. Rapidly decaying blue light emission was observed in an ITO/doped PMMA/Calcium device. The quantum efficiency for the test device was ca. 0.2%.

A solution of polystyrene (20 mg) and compound (8) (20 mg) in chloroform (2 ml) was prepared. Spin-coating at 2000 r.p.m. gave films with typical thickness of 230 nm. Stable blue emission was observed in an ITO/polymer blend/Ca device. The internal quantum efficiency was ca. 1% with a driving voltage of 20V.

EXAMPLE 3

Preparation of 4-(6-hydroxyhexyloxy)benzaldehyde (13)

A solution of potassium hydroxide (13.2 g) and 4-hydroxybenzaldehyde (20.6 g, 169 mmol) in ethanol (320 ml) was refluxed for 30 min. 6-Bromohexanol (24.5 g, 135 mmol) dissolved in ethanol (30 ml) were added and the reaction mixture was refluxed for 16 h. The solvent was then removed in vacuo. Dichloromethane (400 ml) was added no the residue. The organic layer was washed with aqueous sodium hydroxide (1 M, 300 ml), water (500 ml) and brine (250 ml), filtered, dried over anhydrous sodium sulfate and concentrated in vacuo. Recritstallisation of the residue from dichloromethane/petroleum ether yielded (13) as a pale yellow solid (16.7 g, 45%). The analytical data was in accordance with that reported by C. Noel, C. Friedrich, V. Leonard, P. LeBarney, G. Ravaux, and J. C. Dubois, Makromol. Chem., Macromol. Symp., 1989, 24, 283.

Preparation of 6- (2',5'-dimethoxy-4-stilbenoxy)hexanol

A mixture of dimethyl 2,5-dimethoxybenzylphosphonate (2.92 g, 11.2 mmol) and sodium hydride (60% in oil, 1.08 g, 27.0 mmol) in dry DMF (92 ml) was cooled with in an ice-bath under argon. To this was added dropwise a solution of 4-(6-hydroxyhexyloxy)benzaldehyde (13) (2.50 g, 11.3 mmol) in dry DMF (55 ml). The reaction mixture was stirred at 6° C. for 1.5 h and then at room temperature for 4 h. Ether (300 ml) and water (250 ml) were added and the mixture shaken well. The organic layer was separated and washed with water (4×250 ml), dried over anhydrous sodium sulfate, filtered and concentrated in vacuo. The residue was purified by column chromatography over silica (dichloromethane/methanol; 19:1 yield (14) (1.89 g, 47%) as an oil; $\delta_H$ (CDCl$_3$) 1.46 (4 H, m, CH$_2$), 1.60 (2 H, m, CH$_2$), 1.79 (2 H, m, CH$_2$), 3.65 (2 H, t, J =6.6 Hz, OCH$_2$), 3.81 (3 H, s, OCH$_3$), 3.83 (3 H, s OCH$_3$), 3.96 (2 H, t, J=6.5 Hz, OCH$_2$), 6.76 (1 H, dd, $J_{H3',JH4'}$=8.9 Hz, $J_{H6',H4'}$=3.0 Hz, H4'), 6.82 (1 H, d, $J_{H4',H3'}$=8.9 Hz, H3'), 6.87 and 7.45 (4 H, AA'BB', PhH), 7.03 (1 H, d, J=16.5 Hz, vinylic H), 7.13 (1 H, d, $J_{H4',H6'}$=3.0 HZ, H6') and 7.31 H, d, J=16.5 Hz, vinylic H); $\delta_c$ (CDCl$_3$) 25.5, 25.6, 29.2, 32.6, 55.7, 56.2, 62.8, 67.8, 111.3, 112.2, 113.1, 114.5, 120.7, 127.6, 127.7, 128.7, 130.4, 151.2, 153.7 and 158.7.

Preparation of 6-(2',5'-dimethoxy-4-stilbenoxy)hexyl methacrylate (15)

Methacryloylchloride 90%, 0.52 ml, 4.8 mmol) was added dropwise To a stirred solution of 6-(2',5'-dimethoxy-4-stilbenoxy)hexanol (14) (1.54 g, 4.32 mmol) and dry trimethylamine (0.76 ml, 5.5 mmol) in dry tetrahydrofuran (25 ml) under argon. The reaction mixture was stirred at 60° C. for 23 h. Ether (200 ml) and water (100 ml) were added. The organic layer was washed with water (3×100 ml), dried over anhydrous sodium sulfate, filtered and concentrated in vacuo. The residue was purified by column chromatography over silica (dichloromethane/hexane; 4:1 to 1:0) to yield (15) (1.48 g, 81 %] as an oil; $\delta_H$(CDCl$_3$) 1.48 (4 H, m, CH$_2$), 1.70 (2 H, m, CH$_2$), 1.80 (2 H, m, CH$_2$), 1.95 (3 H, m, CH$_3$), 3.81 (3 H, s, OCH$_3$), 3.83 ( 3 H, s, OCH$_3$), 3.96 ( 2 H, J=6.4 Hz, CCH$_2$), 4.16 (2 H, t, J=6.6 Hz, OCH$_2$), 5.55 (1 H, m, H$_A$), 6.10 (1 H, m, H$_B$), 6.76 (1 H, dd, $J_{H4',H3}$=8.2 Hz, $J_{H6',H4}$=2.9 Hz, H4'), 6.82 (1 H, d, $J_{H4',H3}$=8.2 Hz, H3'), 6.87 and 7.46 (4 H, AA'BB', H2, H3, H5, and H6), 7.04 (1 H, d, J=16.5 Hz,. vinytic H), 7.13 (1 H, d, $J_{H4',H6}$=2.9 Hz, H6') and 7.32 (1 H, d, J=16.4 Hz, vinylic H); $\delta_c$ (CDCl$_3$) 18.3, 25.69, 25.74, 28.5, 29.1, 53.4, 55.7, 56.2, 64.6, 67.7, 111.3, 112.2, 113.1, 114.5, 120.9, 125.2, 127.5, 127.7, 128.8, 130.4, 136.4, 151.2, 153.7, 158.6 and 167.4.

Polymerisation of 6-(2',5'-dimethoxy-4-stilbenoxy)hexyl methacrylate (15)

To a solution of 6-(2',5'-dimethoxy-4-stilbenoxy)hexy methacrylate (15) (1.08 g, 2.54 mmol) in dry toluene (5 ml) was added azobis(isobutyroniurile) (1.16 g, 8.78 mmol) over 10 min in several aliquots. The reaction mixture was then stirred at 88° C. for 1 h under argon. The solvent was completely removed. The oily residue was reprecipitated twice from a dichloromethane/hexane mixture. It was Then dissolved in dichloromeuhane, filtered through sodium sulfate and concentrated in vacuo to furnish pure polymer (16) (286 mg, 27%).

EXAMPLE 4

Preparation of 2'-methoxy-5'-tert-butylstilbene-4-carbaldehyde (17)

Dimethyl 2-methoxy-5-tert-butylbenzylphosphonate(11) (16.3 g, 57.0 mmol) and sodium hydride (60% in oil, 4.56 g, 114 mmol) in dry DMF 100 ml) were stirred under argon in an ice bath. A solution of terephthaldehyde mono(diethyl acetal) 17.8 ml, 85.4 mmol) in dry DMF (60 ml) was then added dropwise. The mixture was left to stir overnight. The pale yellow reaction mixture was combined with water (75 ml) and hydrochloric acid (3M, 45 ml) and stirred for 10 min. Then water (500 ml) and ether (600 ml) were added. The organic layer was washed with water (4×750 ml), brine (500 ml), dried over anhydrous sodium sulfate, filtered and concentrated in vacuo. The residue was purified by column chromatography over silica (dichloromethane/hexane; 4:1) and by recrystallization from hot petroleum ether (30–40) to yield (17) (11.6 g, 69%) as a pale yellow solid, m.p. 82°–83° C.; (Found: C, 81.75; H, 7.39. C$_{20}$H$_{22}$O$_2$ requires C, 81.60; H, 7.53%); $\delta_H$ (CDCl$_3$) 1.37 (9 H, s, tert-butyl), 3.88 (3 H, s, OCH$_3$), 6.86 (1 H, d, J=8.7 Hz, PhH), 7.18 (1 H, d, J=16.4 Hz, vinylic H), 7.32 (1 H, dd, J=8.6, 2.4 Hz, PhH), 7.62 (1 H, d, J=2.6 Hz, PhH), 7.65 H, d, J=16.8 Hz, vinylic H), 7.68 and 7.85 (4 H, AA'BB', PhH) and 9.98 (1 H, s, CHO).

Preparation of 2'-methoxy-5'-tert-butylstilbene-4-methano (18)

A solution of 2'-methoxy-5'-tert-butylstilbene-4-carbaldehyde (17) (11.4 g, 38.6 mmol) in dry tetrahydrofuran (30 ml) was added dropwise to a mixture of lithium aluminium hydride (0.82 g, 22 mmol) in dry ether (100 ml). The reaction mixture was refluxed overnight. Then water (60 ml), hydrochloric acid (3 M, 100 ml) and ether (250 ml) were added. The organic layer was washed with water (2×250 ml), brine (150 ml), dried over anhydrous sodium sulfate, filtered and concentrated in vacuo. The residue was purified by column chromatography over silica (dichloromethane) and by recrystallisation from hot hexane to Field (18) (4.94 g, 43%) in form of colourless crystals, m.p. 103°–104° C.; (Found: C, 81.14; H, 8.16. C$_{20}$H$_{24}$O$_2$ requires C, 81.04; H, 8.16%); m/z 296 (96, M+), 281 (100, 263 (34%).

Preparation of 5'-tert-butyl-4-chloromethyl-2'-methoxystilbene (19)

A solution of 2'-methoxy-5'-tert-butylstilbene-4-methanol (5.83 g, 19.7 mmol) in 1,4-dioxane (25 ml) was poured into concd. hydrochloric acid (120 ml). A colourless precipitate appeared immediately. The mixture was stirred for 1 h. Then dichloromethane (250 ml) was added. The organic layer was washed with water (500 ml), brine (250 ml), dried over anhydrous magnesium sulfate, filtered and concentrated vacuo. The residue was purified by column chromatography over silica (dichloromethane) and by recrystallisation from hot hexane to yield (19) (4.26 g, 69%) in form of colourless crystals, m.p. 103°–104° C.; (Found: C, 76.42; H, 7.42. C$_{20}$H$_{24}$ClO requires C, 76.30; H, 7.36%); $\delta_H$ (CDCl$_3$) 1.40 (9 H, s, tert-butyl), 3.90 (3 H, s, OCH$_3$), 4.62 (2 H, s, CH$_2$Cl), 6.88 (1 H, d, J=8.7 Hz, Phil), 7.17 (1 H, d, J=16.5 Hz, vinylic H), 7.32 (1 H, dd, J=8.6, 2.5 Hz, PhH), 7.40 and 7.57 (4 H, AA'BB', PhH), 7.54 (1 H, d, J=16.0 Hz, vinylic H), 7.65 (1 H, d, J=2.4 Hz, PhH); m/z 316, 314 (35, M+), 301, 299 (29, 91%).

Preparation of phosphonate (20)

A solution of 5'-tert-butyl-4-chloromethyl-2'-methoxystilbene (19) (4.16 g, 13.2 mmol) in trimethyl phosphite (48 ml) was refluxed for 24 h. The solvent was then distilled off in vacuo. The residue was purified by column chromatography over silica (dichloromethane) to yield (20) (3.61 g, 70%) as a pale yellow oil; $\delta_H$ (CDCl$_3$) 1.33 (9 H, s, tert-butyl), 3.17 (2 H, d, J=21.8 Hz, CH$_2$P), 3.64 (3 H, s, OCH$_3$), 3.69 (3 H, s, OCH$_3$), 3.86 (3 H, s, aromatic OCH$_3$), 6.83 (1 H, d, J=8.6 Hz, PhH), 7.07 (1 H, d, J=16.4 Hz, vinylic H), 7.24–7.57 (5 H, m, vinylic and PhH).

Preparation of distyrylbenzene (21)

A solution of phosphonate (20) (3.43 g, 8.77 mmol) in dry DMF (100 ml) was added to sodium hydride (60% in oil, 0.96 g, 24 mmol). The solution was cooled in an ice bath and a solution of 4-(6-hydroxyhexyloxy)benzaldehyde (13) (2.08 g, 9.36 mmol) in dry DMF (50 ml) was added dropwise over 30 min. The reaction mixture was stirred at 6° C. for 1.5 h and then at room temperature for 4 h. Water (250 ml) was added and the mixture extracted with ether (2×200 ml). The organic layer was separated and washed with water (3×300 ml), dried over anhydrous magnesium sulfate, filtered and concentrated in vacuo. The residue was purified by column chromatography over silica (dichloromethane/methanol; 10:1) and recrystallised from dichloromethane/hexane to yield (21) (3.08 g, 72%), m.p. 118°–120° C.; (Found: C, 81.77; H, 8.31. C$_{33}$H$_{40}$O$_3$ requires C, 81.94: H, 8.43%): $\delta^H$ (CDCl$_3$) 1.36 (9 H, s, tert-butyl), 1.40–1.86 [8 H, m, (CH$_2$)$_4$], 3.66 (2 H, t, J=6.5 Hz, OCH$_2$), 3.88 (3 H, s, OCH$_3$), 3.96 (2 H, t, J=6.4 Hz, OCH$_2$), 6.84–7.65 (15 H, m, phenyl and vinylic H); m/z 484 (66, M$^+$), 202 (42), 143 (70), 105 (100%).

Esterification of (21) with methacryloyl chloride

To a stirred solution of alcohol (21) (3.05 g, 6.29 mmol) and dry trimethylamine (1.25 ml) in dry tetrahydrofuran (25 ml) under argon was added dropwise methacryloyl chloride (90%, 0.68 ml, 7.0 mmol). The reaction mixture was stirred at 55° C. for 2 h. The solution was poured into ether (200 ml). The organic layer was separated and washed with water (3×200 ml), dried over anhydrous magnesium sulfate, filtered and concentrated in vacuo. The oily residue was purified by column chromatography over silica (dichloromethane/hexane; 1:1) to yield (22) (3.93 g, 84%) as a viscous yellow oil, m.p. 83°–84.5° C.; (Found: C, 80.09; H, 7.96. C$_{37}$H$_{44}$O$_4$ requires C, 80.40; H, 8.00%); $^{67}$H (CDCl$_3$) 1.37 (9 H, s, tert-butyl), 1.40–1.82 [8 H, m, (CH$_2$)$_4$], 1.97 (3 H, s, CH$_3$), 3.88 (3 H, s, OCH$_3$), 3.98 (2 H, t, J=6.2 Hz, OCH$_2$), 4.18 (2 H, J=6.5 Hz, CCH$_2$), 5.56 and 6.12 (2 H, s, =CH$_2$) 6.83–7.63 (15 H, m, PhH and vinylic H); m/z 552.324.

Polymerisation of (22)

To a deoxygenated solution of methacrylate (22) (2.80 g, 4.70 mmol) in dry toluene (30 ml) was added dropwise over 5 h a solution of azobis(isobutyroniurile) (50 mg) in toluene (5 ml) at 90° C. The reaction mixture was then allowed to cool and ether (20 ml) was added. The oily precipitate was reprecipitated twice from dichloromethane/ether to furnish the least soluble fraction of polymer (23) (210 mg, 8%). To the supernatant liquid was added excess ether (120 ml) to obtain anonher fraction of polymer (23) (1.22 g, 47%), m.p. 124°–132° C.; (Found: C, 79.67; H, 8.16; N, 0.27. C$_{37}$H$_{44}$O$_4$ requires C, 80.40; H, 8.00; N, 0.00%); $\lambda_{max}$/nm (CHCl$_3$) 360 (onset of absorption at 415 nm); $\nu_{max}$cm$^{-1}$ 2946m, 2861m, 1724s, 1604m, 1513s, 1494m, 1173s, 1149m, 962m; $\delta$H (CDCl$_3$) 0.90–2.10 (hr. m, aliphanic CH), 1.38 (hr. s, tert-butyl), 3.67 (hr. s, OCH$_3$), 3.95 (br. s, OCH$_2$), 6.79–7.67 (m, phenyl and vinylic H).

Preparation of EL device

A solution of poly(methacrylate) (23) (0.2 g) in chloroform (5 ml) was prepared. Spin-coating at 2000 r.p.m. gave films with typical thickness of 300 pa. Blue(violet) electroluminescence was observed in an ITO/doped PMMA/Calcium device. The internal quantum efficiency was 0.015% at a drive voltage of 44V.

EXAMPLE 5

Preparation of 4-(tert-butyldimethyisilyioxymemhyl) benzylalcohol (24)

A mixture of 4-benzenedimethanol (5.10 g, 36.9 mmol) and sodium hydride (60% in oil, 1.21 g) in tetrahydrofuran (75 ml) was stirred at room temperature for 80 min. tert-Butyldimethylchlorosilane (6.34 g) was added and the reaction mixture was stirred for further 60 min. Ether (250 ml) was added. The organic layer was then washed with saturated sodium bicarbonate (100 ml), brine (150 ml), dried over anhydrous sodium sulfate, filtered and concentrated in vacuo. The residue was purified by column chromatography over silica (ethyl acetate/hexane; 1:4) to yield 4-(tert-butyldimethytsilyloxymethyl)benzylalcohol (24) (4.47 g, 48%); $\nu_{max}$/cm$^{-1}$ 3620m, 3480w, 2920s, 2850s, 1460m, 1370s, 1080s; $^{67}$H (CDCl$_3$) 0.1l(6 H, s, SiCH$_3$), 0.95 (9 H, s, tert-butyl), 2.35 (1 H, bs, OH), 4.61 (2 H, s, CH$_2$O), 4.74 (2 H, s, CH$_2$O) and 7.30 (4 H, s, PhH); $\delta_c$ (CDCl$_3$) –5.2, 18.4, 26.0, 64.8, 65.0, 126.3, 127.0, 139.6 and 140.8.

Preparation of 4-(tert-butyldimethylsilyloxymethyl) benzaldehyde (25)

A solution of oxalyichloride (1.6 ml) in dry dichloromethane (37 ml) was cooled to –70° C. under N$_2$. Dry dimethylsulfoxide (2.5 ml) in dichloromethane (10 ml) and a solution of 4-(tert-butyldimethylsilyloxymethyl) benzylalcohol (24) (3.94 g, 15.6 mmol) in dichloromethane (20 ml) were added carefully. The reaction mixture was stirred at –70° C. for 1 h. trimethylamine (12 ml) was then added. The reaction mixture was allowed to warm up no 0° C. Saturated aqueous sodium bicarbonate (50 ml) was added, the organic layer was separated and the aqueous layer was extracted with dichloromethane (4×50 ml). The combined organic extracts were dried over anhydrous sodium sulfate, filtered and concentrated in vacuo. The residue was purified by column chromatography over silica (dichloromethane/hexane; 4:1) to yield 4-butyldimethylsilyloxymethyl)benzaldehyde (25) 3.21 g, 82%); $\nu_{max}$/cm$^{-1}$ 2020s, 2850s, 2730w, 1700s, 1090s; $\delta_H$ (CDCl$_3$) 0.11 (6H, s, SiCH$_3$), 0.94 (9 H, s, tert-butyl), 4.80 (2 H, s, CH$_2$O), 7.47 and 7.84 (4 H, AA'BB', PhH) and 9.98 (1 H, s, CHO); (CDCl$_3$) –5.3, 18.4, 25.9, 64.4, 126.2, 129.8, 135.3, 148.6 and 192.0; m/z 251.1467 M$^+$+H).

Preparation of disilylated diol (27)

To a solution of 2,5-dimethoxy-p-xylylene-α,α'-bis (triphenylphosphonium chloride) (26) (3.48 g, 4.58 mmol), obtained from 1,4-bis(chloromethyl) -2,5-dimethoxybenzene and triphenylohosphine, and 4-(tert-butyldimethylsilyloxymethyl)benzaldehyde (25) (2.53 g, 10.1 mmol) in dry ethanol (45 ml) was added a freshly prepared solution of sodium ethoxide in ethanol (13 ml). The reaction mixture was stirred under N$_2$ for 65 min. The solvent was then completely removed and the residue was purified by column chromatography over silica (dichloromethane/hexane; 1:1) to give disilyl-protected diol (27) (915 mg, 32%); $\delta_H$ (CD$_2$Cl$_2$) 0.13 (6 H, s, SiCH$_3$), 0.96 (9 H, S, tert-butyl), 3.93 (6 H, s, OCH$_3$), 4.75 (2 H, s, CH$_2$O), 7.16 (2 H, d, J=16.5 Hz, vinylic H), 7.17 (2 H, s, ArH), 7.33 and 7.53 (4 H, AA'BB', ArH), 7.48 (2 H, d, J=16.5 Hz, vinylic H); $\delta_c$ (CD$_2$Cl$_2$) –5.3, 18.5, 25.9, 56.4, 65.0, 109.1, 122.8, 126.57, 126.64, 126.8, 128.8, 136.8, 141.3, 151.7; m/z 630.3561 (M$^+$).

Preparation of diol

A solution of the diprotected material (27) (79.3 mg, 0.126 mmol) mmol) in dichloromethane (3 ml) and tetra-n-butylammonium fluoride (1.0M in tetrahydrofuran, 1.0 ml) was stirred under $N_2$ at 0° C. for 1 h. Saturated aqueous sodium bicarbonate (5 ml) was added. The organic layer was separated and the aqueous layer was extracted with dichloromethane (4×10 ml). The combined organic layers were dried over anhydrous sodium sulfate, filtered and concentrated in vacuo. The residue was purified by column chromatography over silica (dichloromethane) to give diol (28) (52.1 mg, 66%); $\lambda_{max}$nm $(CH_2Cl_2)$ 392 (log $\epsilon$4.617) and 327 (4.421); $\nu_{max}$/cm$^{-1}$ 3320 bm, 12098, 10438, 966s; $\delta$H $(CDCl_3)$ 3.93 (6 H, s, $OCH_3$), 4.68 (4 H, s, $CH_2OH$, 7.16 (2 H, d, J=16.5 Hz, vinylic H), 7.17 (2 H, s, ArH), 7.36 and 7.56 (4 H, AA'BB', ArH), 7.49 (2 H, d, J=16.5 Hz, vinylic H); $\delta_c$ $(CD_2Cl_2)$ 56.4, 65.1, 109.1, 123.2, 126.6, 126.8, 127.5, 128.7, 137.3, 140.8, 151.7; m/z 402.1831.

Preparation of Polymer (29)

Figure 12:
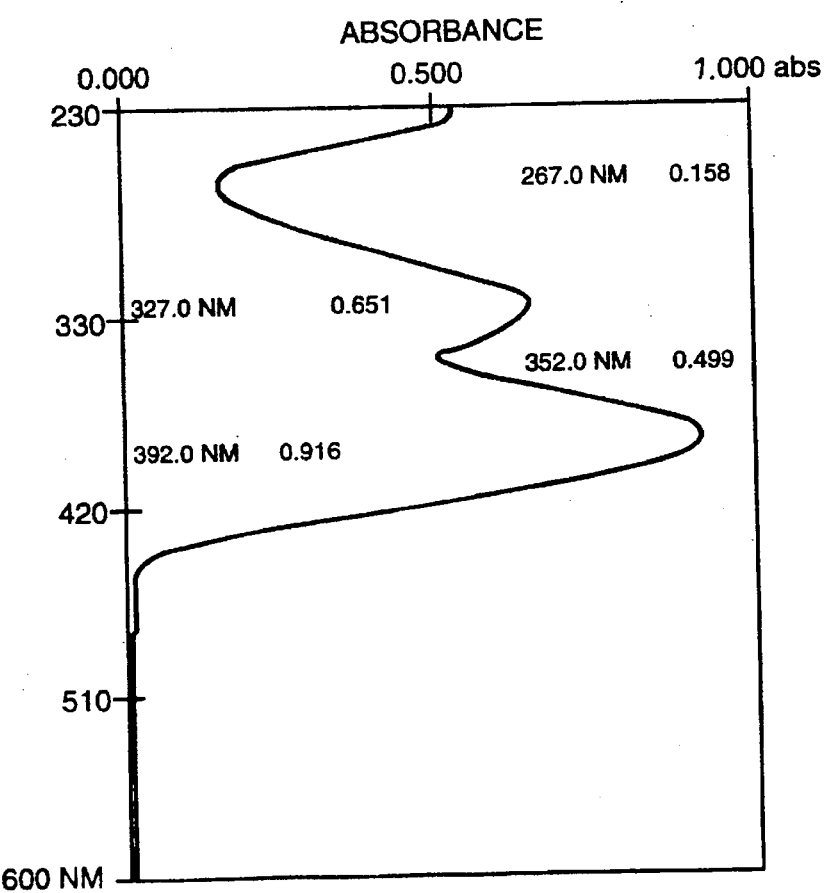
FIG. 12 is a graph showing the UV-VIS spectrum of a solution of polymer (29) in dichloromethane.

To a solution of sebacoyl chloride (0.120 g, 0.5 mmol) in dry tetrahydrofuran (2 ml) under argon was added a solution of diol (28) (0.202 g, 0.5 mmol) and pyridine (0.12 ml, 1.3 mmol) in dry tetrahydrofuran (5 ml). After stirring for 2 h, during which time a white solid precipitated, dichloromethane (20 ml) was added. The solution was washed with hydrochloric acid (1 M, 20 ml) and water (3×20 ml) and the solvent evaporated in vacuo to a volume of ca. 5 ml. Hexane (20 ml) was added and a yellow precipitate was filtered off and washed with hexane. The solid was redissolved in dichloromethane (5 mt), reprecipitated with ethanol (25 ml), filtered and washed with ethanol to yield (29) (0.20 g, 71%) as a yellow solid, m.p. 97°–112° C. The $^1$H NMR and microanalytical analyses indicate an oligomer of formula $(diol)_6(diacid)7$; $\lambda_{max}$/nm $(CH_2Cl_2)$ 392 (onset of absorption at 445 nm) and 327 (cf. FIG. 12); $\nu_{max}$/cm$^{-1}$ 3035w, 1734s, 1608m, 1210s, 1164s, 1042s, 966s. $\delta_H$ $(CDCl_3)$ 1.01 (s, alkyl), 1.45 (bs, alkyl), 2.16 (t, J=7.6 Hz, $CH_2CO_2$); 3.72 (s, OMe) 4.91 (s $CH_2O$), 6.9–7.4 (m, phenyl and vinylic H); [Found: C, 75.28; H, 7.12%. Oligomer $(diol)_6(diacid)_7$requires C, 75.09; H, 7.09%].

Preparation of EL Device

A solution of the polymer (29) (30 mg) in chloroform (1 ml) was prepared. Spin-coating at 2000 r.p.m. gave films with thickness of 300 nm. Blue-green electroluminescence was observed in an ITO/polymer/Ca device. The internal quantum efficiency was 0.01% at a drive voltage of 50V.

EXAMPLE 6

Figure 13:
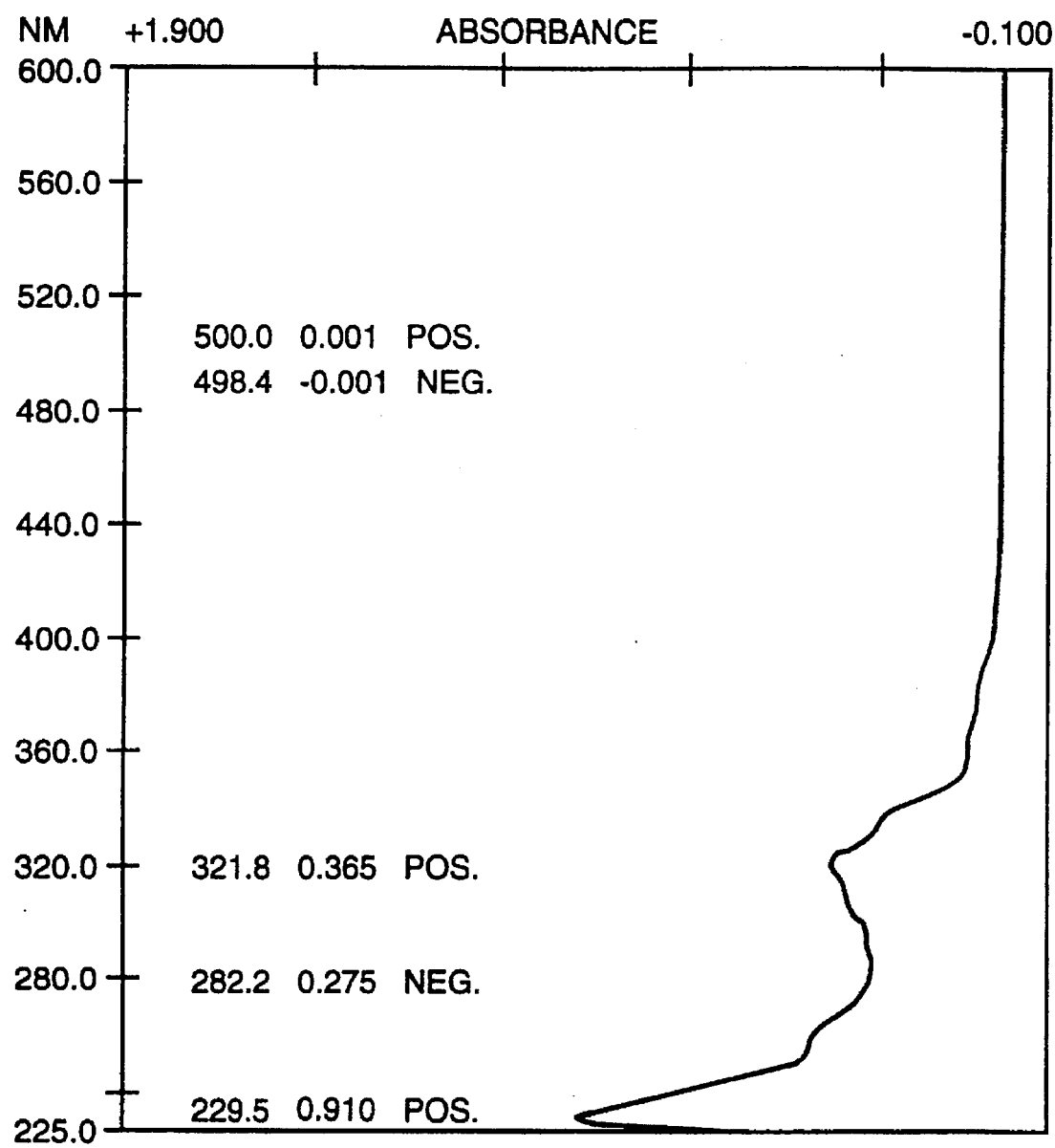
FIG. 13 is a graph showing the UV-VIS spectrum of a solution of polymer (31) in dichloromethane.
Figure 14:
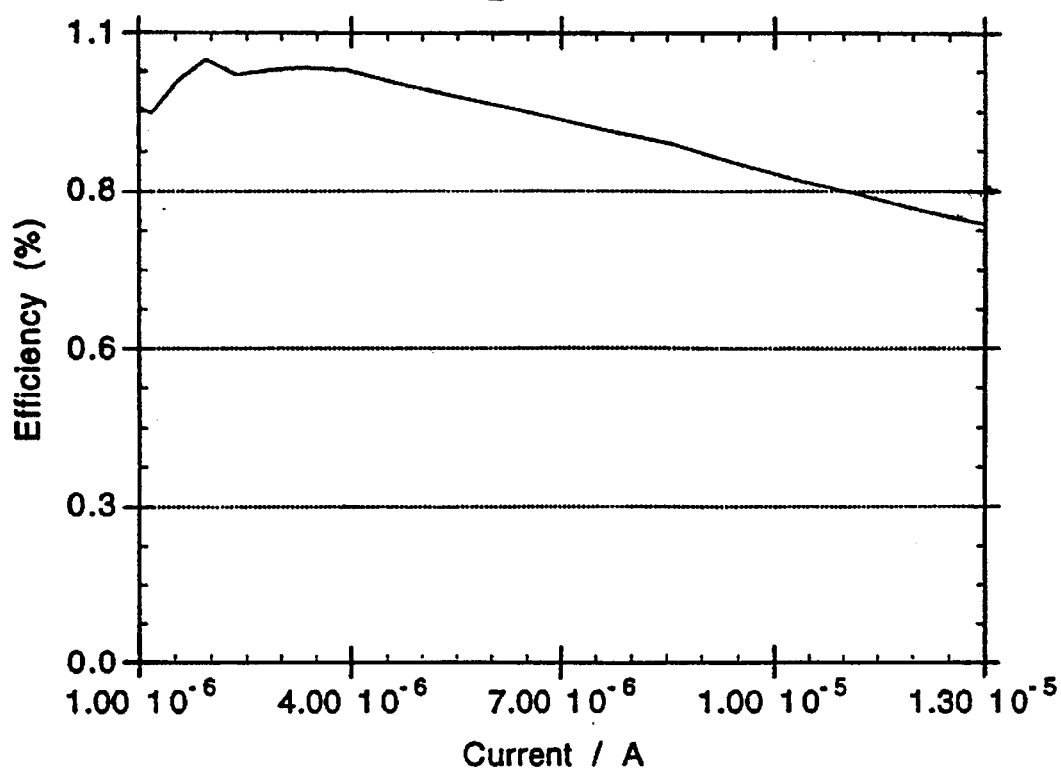
FIG. 14 is a graph showing the efficiency/current relationship in a thin film of a blend of compound (8) in polystyrene (50:50).
Figure 15:
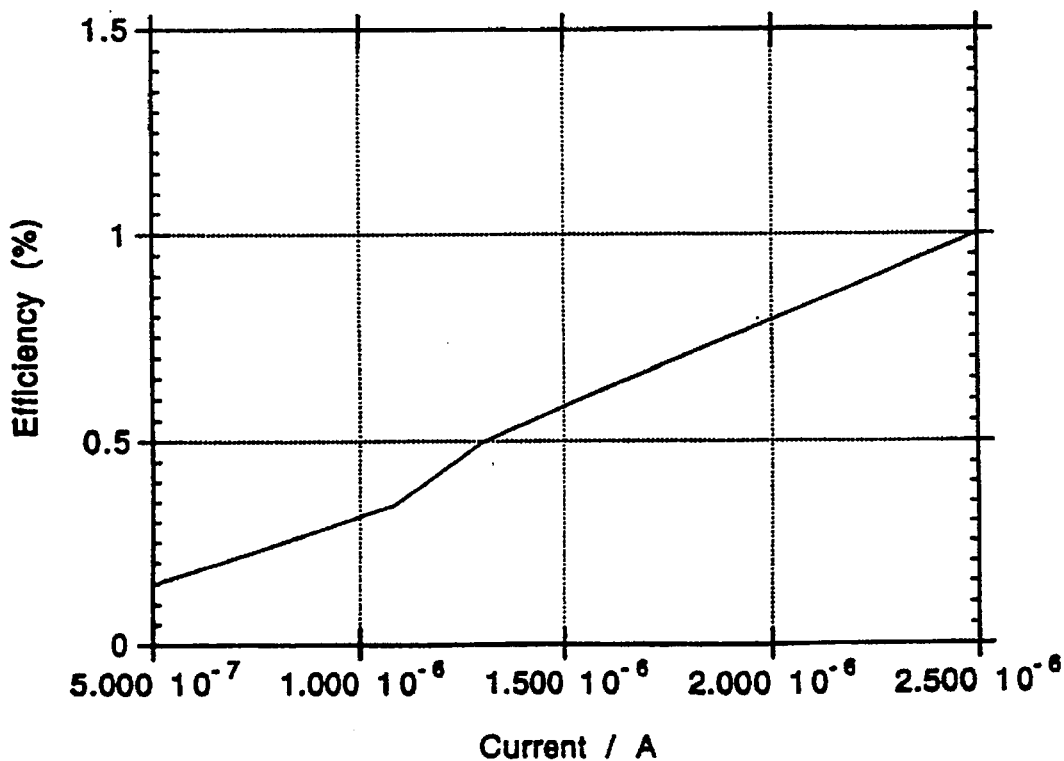
FIG. 15 is a graph showing the efficiency current relationship in a thin film of a blend of polymer (41) and polystyrene (1:9).
Figure 16:
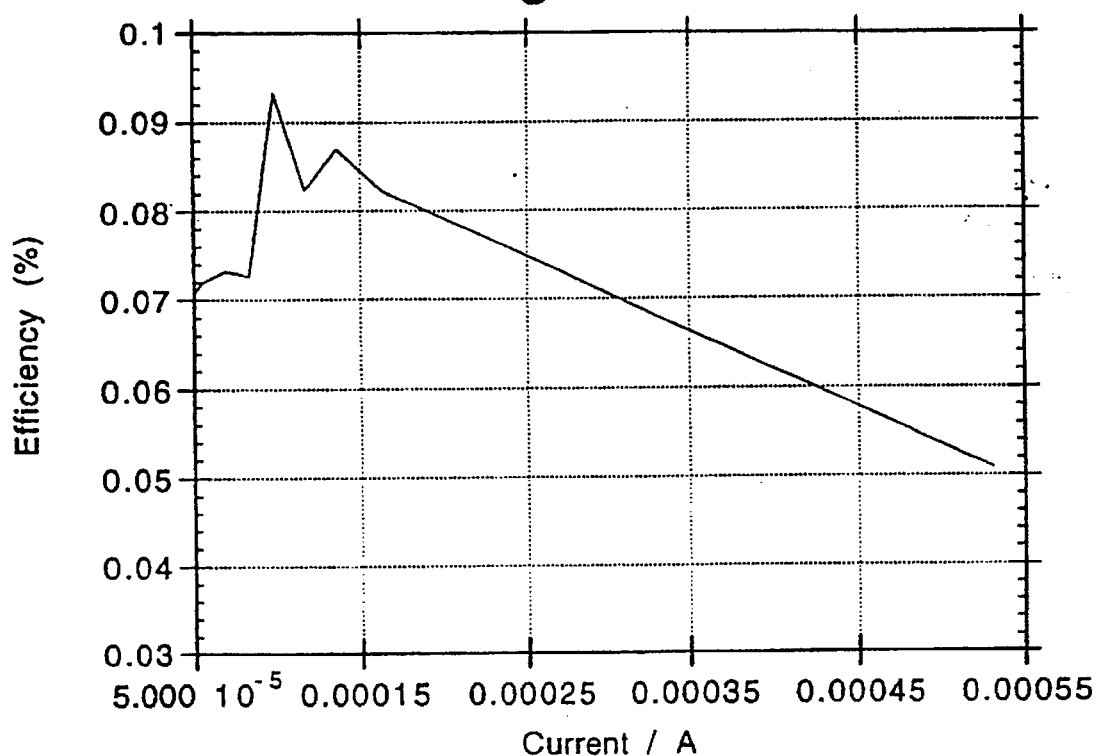
FIG. 16 is a graph showing the efficiency current relationship in a thin film of a blend of polymer (41) and polystyrene (1:4) in a bilayer device- ITO/PPV/polymer blend/Ca.
Figure 17:
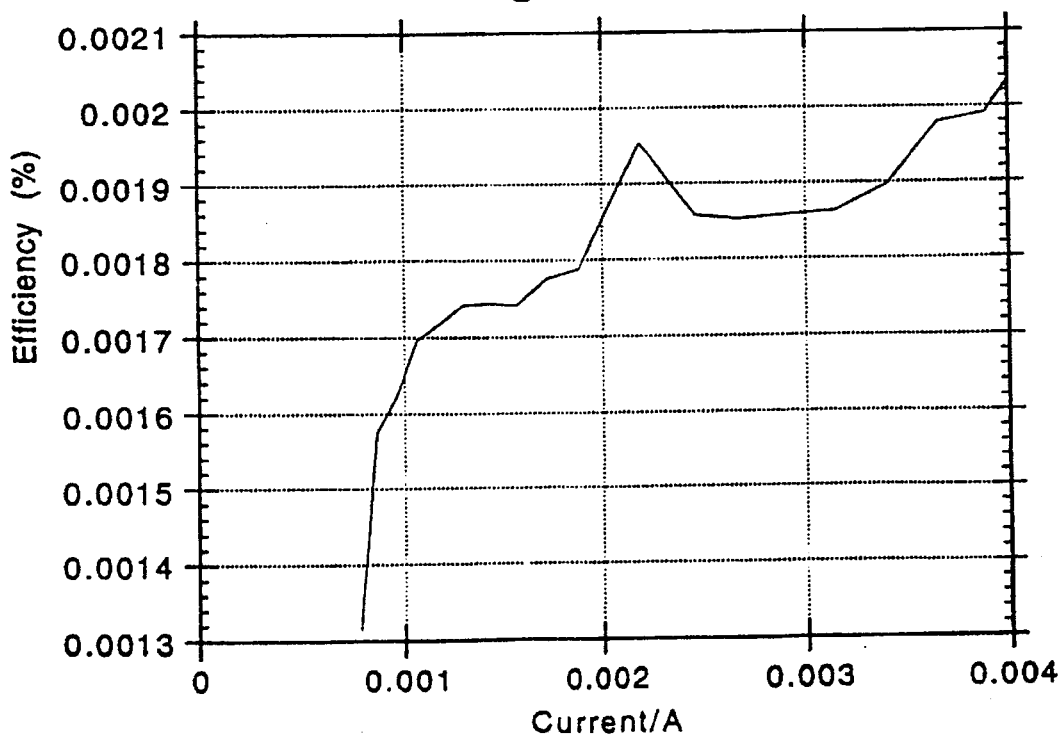
FIG. 17 is a graph showing the efficiency current relationship for a thin film of a blend of polymer (42) and oxadiazole (43) (50:50)

A solution of thiophenol (0.18 ml, 1.8 mmol) in methanolic tetra-5-butylammonium hydroxide (1.0M, 1.8 ml, 1.8 mmol) was added to a solution of sulfonium precursor polymer (30) (4% w/w, 5.0 g) in methanol. A creamy white precipitate formed almost immediately. The polymer was collected by suction filtration and dissolved in chloroform (50 ml). The clear, pale green solution was poured onto methanol (800 ml). The precipitate was again collected by suction filtration and dried to yield polymer (31) in form of a pale green solid (126 mg); $\lambda_{max}$nm $(CH_2Cl_2)$ cf. FIG. 13.

EXAMPLE 7

4-Mercapcomethylstilbene (32a)

A mixture of 4-chloromenhylstilbene (2.27 g, 10.8 mmol) and chiourea (0.93 g, 12 mmol) in ethanol (70 ml) was heated to reflux for 20 h. Aqueous sodium hydroxide (2.5M, 11 ml) was added to the hoc solution and the reaction mixture was stirred for further 6 h. Sulfuric acid (10%, 40 ml) was then added and the mixture left overnight, water (400 ml), ether (450 and dichloromethane (200 ml) were added. The organic layer was separated and concentrated in vacuo and the residue purified by column chromatography over silica (dichloromethane/hexane; 4:1) to give (32a) (1.69 g, 83%), m.p. 105°–107° C.; (Found: C, 79.70; H, 6.01; S, 14.32. $C_{15}H_{14}S$ requires C, 79.60; H, 6.24; S, 14.16%); $\lambda_{max}$/nm $(CH_2Cl_2)$ 302 (log $\epsilon$4.49) and 315 (4.50); $\delta$H $(CDCl_3)$ 1.78 (1 H, n, J=7.5 Hz, SH), 3.76 (2 H, d, J=7.5 Hz, $CH_2S$), 7.10 (2 H, s, PhH or vinylic H), 7.33 and 7.50 (9 H, m, PhH or vinylic H).

Attachment of (32a) to dimethoxy-PPV precursor polymer (34)

A mixture of bis-sulfonium salt (33) (1.03 g, 2.50 mmol) and methanol (6.4 ml) was deoxygenated and cooled with an ice-bath. A methanolic cetra-5-butylammonium hydroxide solution (0.4M, 6.2 ml) was added dropwise. The precipitate slowly dissolved and a greenish viscous solution formed. The reaction mixture was stirred for 1 h at 0° C. and was neutralised by addition of a solution of hydrogen chloride in methanol. 4-Mercapcomethylstilbene (32a) (678 mg), dichloromethane (3 ml) and a methanolic tetra-n-butylammonium hydroxide solution (0.4 M, 8.0 ml) were added. The reaction mixture became greenish yellow and a yellow precipitate formed slowly. Dichloromethane (15 ml) was added co dissolve the residue. The reaction mixture was further stirred for 16 h at room temperature was then concentrated and diluted with methanol (50 ml). The precipitate was collected by suction filtration and washed with methanol (50 ml) and ether (50 ml). The residue (35a) was dissolved in chloroform.

EXAMPLE 8

2,5-Dimethoxystilbene-4'-methanol

Sodium hydride (60% in oil, 2.93 g) and dimethyl 2,5-dimethoxybenzyiphosohonate (6.73 g, 25.9 mmol) in dry DMF (80 ml) were stirred at room temperature under $N_2$ for 45 min. The reaction mixture was cooled in an ice bath and a solution of terephthaldehyde mono(diethylacetal) was added dropwise over 25 min. After stirring for 3 h, water (25 ml) was added dropwise, followed by hydrochloric acid (10M, 20 ml), ether (300 ml) and more water (400 ml). The organic layer was separated, washed with water (3×250 ml), dried over anhydrous sodium sulfate, filtered, and concentrated in vacuo. The residue was purified by column chromatography over silica (dichloromethane). The crude 2,5-dimethoxystilbene-4'-carbaldehyde (4.13 g) obtained, lithium aluminium hydride (1.92 g) and ether (250 ml) were heated to reflux for 3 days. Water (50 ml), followed by hydrochloric acid (3M, 110 ml) were then added. The organic layer was separated, washed with water (2×250 ml), dried over anhydrous sodium sulfate, filtered, and concentrated that. The residue was purified by column chromatography over silica (dichloromethane/methanol; 39:1) to give some 4,4'-(2,5-dimethoxystyryl)benzene and the desired 2,5-dimethoxystilbene-4'-methanol (1.81 g, 26%); $\delta_H$ $(CDCl_3)$ 1.98 (1 H, bs, OH), 3.81 ( 3 H, s, $OCH_3$), 3.84 (3 H, s, $OCH_3$), 4.66 (2 H, s, $CH_2O$), 6.79 (1 H, dd, J=7.7, 2.8 Hz), 6.83 (1 H, d, J=7.7 Hz), 7.08 and 7.46 (2 H, d, J=16.5 Hz, vinylic H), 7.15 (1 H, d, J=2.8 Hz), 7.32 and 7.52 (4 H, AA'BB'); 6c $(CDCl_3)$ 55.7, 65.0, 111.6, 112.2, 113.7, 123.2, 126.7, 127.1, 127.2, 128.9, 137.1, 140.1, 151.4, and 153.7.

4'-Chloromethyl-2,5-dimethoxystilbene 2,5-Dimethoxystilbene-4'-methanol (1.18 g, 4.36 mmol) in dichloromethane (3 ml) and hydrochloric acid (10M, 100 ml) was stirred for 1 h at room temperature. Ether (100 ml) and water (100 ml) were added and the organic layer separated, washed with water (2×125 ml), dried over anhydrous sodium sulfate, filtered and concentrated in vacuo. The residue was purified by column chromatography over silica (dichloromethane) to give 4'-chloromethyl-2,5-dimethoxystilbene (856 mg, 68%); $\delta_H$; (CDCl$_3$) 3.83 (3 H, s, OCH$_3$), 3.85 (3 H, s, OCH$_3$), 4.59 (2 H, s, CH$_2$Cl), 6.81 (1H, dd, J=8.8, 2.7 Hz), 6.85 (1 H, d, J=8.8 Hz), 7.10 and 7.49 (2 H, d, J=16.5 Hz, vinylic H), 7.17 (1 H, d, J=2.7 Hz), 7.37 and 7.53 (4 H, AA'BB'); $\delta_c$ (CDCl$_3$) 46.1, 55.7, 56.0, 111.5, 112.2, 113.6, 123.9, 126.8, 128.4, 128.7, 136.4, 137.9, 151.4 and 153.6.

4'-Mercaptomethyl-2,5-Dimethoxystilbene (32b)

A solution of 4'-chloromethyl-2,5-dimethoxystilbene (856 mg, 2.96 mmol), thiourea (0.29 g, 3.8 mmol), and ethanol (16 ml) was heated to reflux for 3.5 h. Aqueous sodium hydroxide (2.5 M, 2.8 ml) was added and the mixture refluxed for further 2 h. The reaction mixture was allowed to cool and dichloromethane (50 ml), ether (200 ml) and sulfuric acid (10%, 10 ml) were added. The organic layer was separated, washed with water (2×200 ml), brine (100 ml), dried over anhydrous sodium sulfate, filtered, and concentrated in vacuo. The residue was purified by column chromatography over silica (dichloromethane/hexane; 4:1) to give (32b) (328 mg, 39%); $v_{max}$/cm$^{-1}$ 2950s, 1490m, 1470s, 1430m, 1390s, 1215s, 1180s, 1050s.

Attachment of (32b) to dimethoxy-PPV precursor polymer (34)

A mixture of bis-sulfonium salt (33) (1.03 g, 2.50 mmol) and methanol (6.4 ml) was deoxygenated and cooled with an ice-bath. A methanolic tetra-n-butylammonium hydroxide solution (0.4M, 6.2 ml) was added dropwise. The precipitate slowly dissolved and a greenish viscous solution formed. The reaction mixture was stirred for 1 h at 0° C. and was neutralised by addition of a solution of hydrogen chloride in methanol. A solution of (32b) (303 mg) in methanolic tetra-n-butylammonium hydroxide (0.4M, 2.8 ml) was added. A precipitate formed rapidly. Dichloromethane (4 ml) was added to dissolve the residue. The reaction mixture was further stirred for 16 h at room temperature. It was then concentrated and diluted with methanol (50 ml). The precipitate was collected by suction filtration and washed with methanol (100 ml) and ether (100 ml). The residue (35b) was dissolved in chloroform to give a greenish yellow solution.

EXAMPLE 9

Attachment of (32a) to PPV precursor polymer (36)

A solution of tetrabutylammonium hydroxide (1.0 M in methanol, 0.44 ml) and mercaptomethylstilbene (32b) (0.112 g, 0.52 mmol) in THF (15 ml) was added slowly to a solution of the tetrahydrothiophene precursor to PPV (36) in methanol (7.9 g of a 1.5% w/w solution in methanol) under argon, and stirred for 2 h. The resulting yellow precipitate was filtered off and dried under vacuum. Dichloromethane (40 ml) was added, followed by a solution of tetrabutylammonium hydroxide (1.0 M in methanol, 0.24 ml) and mercaptomethylstilbene (32b) (0.064 g, 0.28 mmol) in THF (10 ml) and the mixture was stirred for 12 h under argon. During this time the precipitate broke up and partially dissolved. The solution was filtered, and the filtrate was concentrated in vacuo to a volume of ca. 10 ml. Methanol was added and the resulting precipitate was recovered by filtration and dried to yield (37) (65 mg) as a yellow powder. GPC analysis against polystyrene standards in chloroform indicated a number average molecular weight of 10,000.

EXAMPLE 10

1,4-Dibromo-2,5-dihexyloxybenzene (38)

A solution of bromine (110 mmol, 17.2 g) in chloroform (30 ml) was added to a solution of dihexyloxybenzene (54.0 mmol, 15.0 g) in chloroform (100 ml) at room temperature over 1 h. After a further 18h, the brown mixture was washed with aqueous sodium metabisulphite (50 ml), aqueous NaHCO$_3$ (1M, 50 ml×2), water (50 ml) and brine (50 ml), dried (MgSO$_4$), evaporated and dried under vacuum to give a colourless solid (23.2 g). Further purification was achieved by recrystallisation from methanol (180 ml) to give a pure product (21.7 g, 93%); m.p. 62°–63° C.; Rf (dichloromethane) 0.77; $v_{max}$ (KBr/cm$^{-1}$) 2920 (C—H), 1500 (Ph), 1220 (Ph—O), 1020 (C—O); $^{67}$H (400 MHz, CDCl$_3$) 0.89 (6H, t, J 6.9, Me) 1.32 (8H, m), 1.47 (4H, m), 1.78 (4H, m), 3.93 (4H, t, J 6.5), 7.07 (2H, s, Ph); $\delta_c$ (100 MHz, CDCl$_3$) 14.0 (Me), 22.5, 25.6, 29.0, 31.4, 70.2, 111.1 (PhC—Br), 118.4 (PhC—H), 150.0 (PhC—O).

1-Bromo-2,5-dihexyloxybenzene-4-boronic acid (39)

Butyllithium (48.2 mmol, 30.2 ml, 15% in hexane) was added into a solution of 1,4-dibromo-2,5-dihexyloxybenzene (48.2 mmol, 21.0 g) in ether (195 ml) under argon at between –10° to –30° C. over 15 min. The mixture was allowed to warm to room temperature and was stirred for further 2 h. It was then transferred into a solution of freshly distilled trimethyl borate (145 mmol, 16.4 ml) in ether (390 ml) under argon at –60° C. The mixture was allowed to warm to room temperature and was stirred for further 15 h. Aqueous hydrochloric acid (2M, 300ml) was added into the mixture, and the aqueous layer was separated and extracted with ether (100 ml×2). The combined organic layer was evaporated and $^{40}$‰ petroleum ether (200 ml) was added. A colourless solid was recovered by filtration and dried under vacuum. Further purification was carried out by column chromatography over silica (60 g), with toluene (200 ml) as an eluent to remove by-products. Elution with ether (300 ml) produced a pure product. (8.9 g, 46%); m.p. 102°–103° C.; Rf (ether), 0.71; $\gamma_{max}$ (KBr, cm$^{-1}$) 3360 (OH), 2940 (C—H), 1200 (Ph), 1040 (C—O), 810 (Ph); $\delta_H$ (400 MHz, CDCl$_3$) 0.91 ($^{67}$H, m, Me), 1.33 (8H, m), 1.44 (4H, m) 1.80 (4H, m) 4.00 (4H, m), 6.48 (2H, s, OH), 7.09 ($^1$H, s, Ph), 7.36 (ill, s, Ph); t $\delta_c$ (100 MHz, CDCl$_3$) 13.9, 22.5, 25.5, 29.1, 31.4, 69.6, 116.3, 116.4 (PhC—H), 118 (br, C—B), 120.5 (PhC—H), 149.6 (PhC—O), 158.0 (PhC—O).

4-Bromobenzeneboronic acid (40)

A solution of butyllithium (21.2 mmol, 15%, 13.3 ml) in hexane was slowly added to a solution of 1,4-dibromobenzene (21.2 mmol, 5.0 g) in ether (86 ml) at –40° C. under argon. The mixture was allowed to warm to room temperature and was stirred for further 2 h. The mixture was transferred into a solution of freshly distilled trimethyl borate (63.3 mmol, 7.2 ml) in ether (172 ml) at –60° C. under argon. The mixture was allowed to warm to room temperature and refluxed for further 20 h. Aqueous hydrochloric acid (2M, 127 ml) was added, and the aqueous phase was separated and extracted with ether (90 ml). The solvent was removed from the combined organic layers and petroleum ether was added. A colourless solid was recovered by filtration (ca 5 g). Further purification was carried out by column chromatography over silica (64 g), with toluene (200 ml) as an eluent to remove by-products. Elution with ether (300 ml) produced a pure product.(2.0 g, 48%); m.p. 282°–283° C., Rf (ether), 0.42; $v_{max}$ (KBr, cm$^{-1}$) 3020 (Ph), 1580 (Ph), 830 (Ph); $\delta_H$ (250 MHz, CDCl$_3$) 4.63 (2H, s, OH), 7.64 (2H, d, J 6.6, 3,5-PhH), 8.05 (2H, d, J 6.6, 2,6-PhH).

Poly (2,5-di-n-hexyloxy-phenylene) (41)

A mixture of 1-bromo-2,5-dihexyloxybenzeneboronic acid (1.0 mmol, 400 mg), Pd(PPh$_3$)$_4$ (4.1 mmol, 4.8 mg), toluene (5.0 ml) and aqueous Na$_2$CO$_3$ (2M, 3.2 ml) were refluxed for 48 h under argon. The mixture was poured into acetone (20 ml). A dark solid was recovered by filtration, washed with aqueous HCl (2M, 30 ml) and dried under vacuum (0.48 g). Further purification was carried out by extraction in a Soxhlet apparatus with chloroform (120 ml)

for 19 h. After the solvent was removed, the residue was poured into acetone (20 ml). A grey solid was recovered by filtration and dried. Its fluorescence colour was violet. (119 mg, 43%); (Found: C, 77.2; H, 10.2. $C_{18}H_{30}O_2$ requires C, 77.6; H, 10.9 %); $v_{max}$ (KBr, cm$^{-1}$) 202- (C—H), 1460 (Ph), 1210 (Ph—O), 1060 (C—O), 840 (Ph); $\delta_H$ (250 MHz, CDCl$_3$) 0.87 ($^{67}$H, d, J 5.5, Me), 1.28 (12H, s), 1.68 (4H, d, J 6.1), 3.92 (4H, t, J 5.4), 7.10 (2H, s, PhH).

Poly (2,5-di-hexyloxy-1,4-phenylene-co-1,4-phenylene) (42)

A mixture of (39) (0.6 mmol) and (41) (0.3 mmol) was polymerised in an identical fashion as (41) to yield a brown solid( (130 mg, 61%); $v_{max}$ (KBr, cm$^{-1}$) 2920 (C—H), 1420 (Ph), 1200 (Ph—O), 1050 (C—O), 810 (Ph); $\delta$H (400 MHz, CDCl$_3$) 0.88 ($^{67}$H, d, J 6.1, Me), 1.31 ($\delta_H$, s, 1.42 (4H, s), 1.74 (4H, s), 3.97 (4H, M, J 6.8), 7.10 (4H, d, J 6.7, Ph), 7.75 ($^1$H, s, Ph), 7.78 ($^1$H, s, Ph).

Preparation of EL devices

A) A solution of (41) (4 mg) and polystyrene (36 mg) in 1 ml of chloroform was prepared. Spin-coating at 2000 r.p.m. gave films of 300 nm. Blue emission was observed in an ITO/blend/calcium device. The internal quantum efficiency was 1.2% at a driving voltage of 90V.

B) A solution of (41) (8 mg) and polystyrene (32 mg) in 2 ml of chloroform was prepared. Spin-coating at 2000 r.p.m. gave films of 80 nm. Blue-green emission was observed in an ITO/PPV/polymer blend/calcium device. The internal quantum efficiency was 0.15% at a driving voltage of 50V.

C) A solution of (42) (22 mg) ant oxadiazole (43) (22 in 1.5 ml of chloroform was prepared. Spin-coating at 2000 r.p.m. gave films of 180 nm. Blue emission was observed in an ITO/polymer blend/calcium device. The internal quantum efficiency was 0.005% at a driving voltage of 10V.

We claim:

1. An electroluminescent device incorporating an emissive layer comprising a processible polymer matrix and a chromophoric component which emits radiation in the region of 400–500 nm when excited to luminesce, wherein the chromophoric component is blended with the polymer matrix or covalently attached thereto as a side group and is selected from stilbene or distyrylbenzene, where at least one ring of stilbene or distyrylbenzene is substituted with a solubilizing group.

2. An electroluminescent device according to claim 1, wherein the chromophoric component is selected to emit radiation in the region 430 nm to 480 nm.

3. An electroluminescent device according to claim 1, wherein aromatic groups of stilbene or distyrylbenzene are linked by a double bond in trans conformation.

4. An electroluminescent device according to claim 1, wherein the stilbene or distyrylbenzene is covalently attached to the polymer matrix by a non-conjugated spacer region.

5. An electroluminescent device according to claim 1, wherein the stilbene or distyrylbenzene is asymmetric.

6. An electroluminescent device according to claim 1, wherein the polymer matrix comprises poly (methylmethacrylate).

7. An electroluminescent device according to claim 1, wherein the chromophoric component forms at least a part of a chromophoric polymer and is blended with the polymer matrix.

8. An electroluminescent device according to claim 1, wherein the polymer matrix comprises poly (methylmethacrylate), polycarbonate or polystyrene.

* * * * *